(12) United States Patent
Matsubara

(10) Patent No.: US 10,853,706 B2
(45) Date of Patent: Dec. 1, 2020

(54) LIQUID CONSUMING DEVICE AND COMPUTER-READABLE STORAGE MEDIUM

(71) Applicant: BROTHER KOGYO KABUSHIKI KAISHA, Nagoya (JP)

(72) Inventor: Yu Matsubara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/362,873

(22) Filed: Mar. 25, 2019

(65) Prior Publication Data
US 2019/0303732 A1  Oct. 3, 2019

(30) Foreign Application Priority Data
Mar. 30, 2018  (JP) .................. 2018-067607

(51) Int. Cl.
*G06K 15/00*  (2006.01)
*B41J 2/175*  (2006.01)

(52) U.S. Cl.
CPC ........ *G06K 15/005* (2013.01); *B41J 2/17543* (2013.01); *G06K 15/4075* (2013.01)

(58) Field of Classification Search
CPC ............. G06K 15/005; G06K 15/4075; B41J 2/17543; B41J 2002/17573; B41J 2/17546; B41J 2/17566; B41J 29/13; B41J 2/17509; B41J 2/17513; B41J 2/1752; B41J 2/17523; B41J 2/1753; B41J 2/17553
USPC .............................................. 358/1.14, 1.15
See application file for complete search history.

(56) References Cited

U.S. PATENT DOCUMENTS

| | | | |
|---|---|---|---|
| 5,315,317 A | 5/1994 | Terasawa et al. | |
| 6,796,627 B2 * | 9/2004 | Kimura | B41J 2/17509 347/7 |
| 9,573,380 B2 * | 2/2017 | Ishida | B41J 2/17566 |
| 2005/0264850 A1 * | 12/2005 | Kim | H04N 1/46 358/2.1 |

(Continued)

FOREIGN PATENT DOCUMENTS

| | | |
|---|---|---|
| JP | H03-32851 A | 2/1991 |
| JP | 2008-213162 A | 9/2008 |
| JP | 2013-092816 A | 5/2013 |

*Primary Examiner* — Tammy Paige Goddard
*Assistant Examiner* — Darryl V Dottin
(74) *Attorney, Agent, or Firm* — Scully, Scott, Murphy & Presser, P.C.

(57) ABSTRACT

A liquid consuming device, including an attachment case, to which a cartridge including a first compartment is attachable, a first channel connectable with the first compartment, a tank including a second compartment connected with the first channel, a second channel connected with the second compartment, a head connected with the second channel, a display, and a controller, is provided. The controller controls, in response to a first remainder amount being an amount of a liquid in the cartridge being greater than or equal to a first predetermined amount, the display to display a first screen including a first object indicating the first remainder amount, and controls, in response to the first remainder amount being smaller than the first predetermined amount, the display to display the first screen including a second object, which indicates a second remainder amount being an amount of the liquid in the tank.

16 Claims, 17 Drawing Sheets

(56) References Cited

U.S. PATENT DOCUMENTS

2008/0204488 A1     8/2008   Usui
2013/0100473 A1     4/2013   Ono

* cited by examiner

LIQUID CONSUMING DEVICE AND COMPUTER-READABLE STORAGE MEDIUM

CROSS REFERENCE TO RELATED APPLICATION

This application claims priority under 35 U.S.C. § 119 from Japanese Patent Application No. 2018-067607, filed on Mar. 30, 2018, the entire subject matter of which is incorporated herein by reference.

BACKGROUND

Technical Field

The present disclosure is related to an aspect of a liquid consuming device having an attachment case, to which a cartridge is attachable, and a tank, and to a computer-readable storage medium therefor.

Related Art

A liquid consuming device having an attachment case, to which a cartridge to contain liquid is attachable, and a tank, is known. When the cartridge is attached to the attachment case, the liquid in the cartridge may flow into the tank.

For example, an image forming apparatus having a display, which may display an amount of liquid remaining in an attached cartridge, is known. A user viewing the display may recognize the amount of the liquid remaining in the cartridge.

SUMMARY

While the display may show the amount of the liquid remaining in the cartridge, an amount of the liquid remaining in the tank fixed in the image forming apparatus may be unrecognizable to the user.

The present disclosure is advantageous in that a liquid consuming device and a computer readable storage medium therefor, which may inform a user of a remainder amount of liquid in a cartridge and a tank, is provided.

According to an aspect of the present disclosure, a liquid consuming device, including an attachment case, to which a cartridge with a first compartment to store a liquid is attachable; a first channel connectable with the first compartment in the cartridge attached to the attachment case; a tank having a second compartment connected with the first channel; a second channel connected with the second compartment in the tank; a head connected with the second channel; a display; and a controller, is provided. The controller is configured to, in response to a first remainder amount being greater than or equal to a first predetermined amount, the first remainder amount being an amount of the liquid stored in the cartridge attached to the attachment case, control the display to display a first screen including a first object, the first object indicating the first remainder amount; and in response to the first remainder amount being smaller than the first predetermined amount, control the display to display the first screen including a second object, the second object indicating a second remainder amount being an amount of the liquid in the tank.

According to another aspect of the present disclosure, a non-transitory computer readable storage medium storing computer readable instructions that are executable by a computer in a liquid consuming device is provided. The liquid consuming device includes an attachment case, to which a cartridge comprising a first compartment to store a liquid is attachable, a first channel connectable with the first compartment in the cartridge attached to the attachment case, a tank comprising a second compartment connected with the first channel, a second channel connected with the second compartment in the tank, a head connected with the second channel, and a display. The computer readable instructions, when executed by the computer, cause the computer to, in response to a first remainder amount being greater than or equal to a first predetermined amount, the first remainder amount being an amount of the liquid stored in the cartridge attached to the attachment case, control the display to display a first screen including a first object, the first object indicating the first remainder amount; and in response to the first remainder amount being smaller than the first predetermined amount, control the display to display the first screen including a second object, the second object indicating a second remainder amount being an amount of the liquid in the tank.

BRIEF DESCRIPTION OF THE ACCOMPANYING DRAWINGS

FIG. 1A is a perspective exterior view of a printer 10 according to an embodiment of the present disclosure with a cover 87 at a covering position. FIG. 1B is a perspective exterior view of the printer 10 according to the embodiment of the present disclosure with the cover 87 at an open position.

Figure 5:
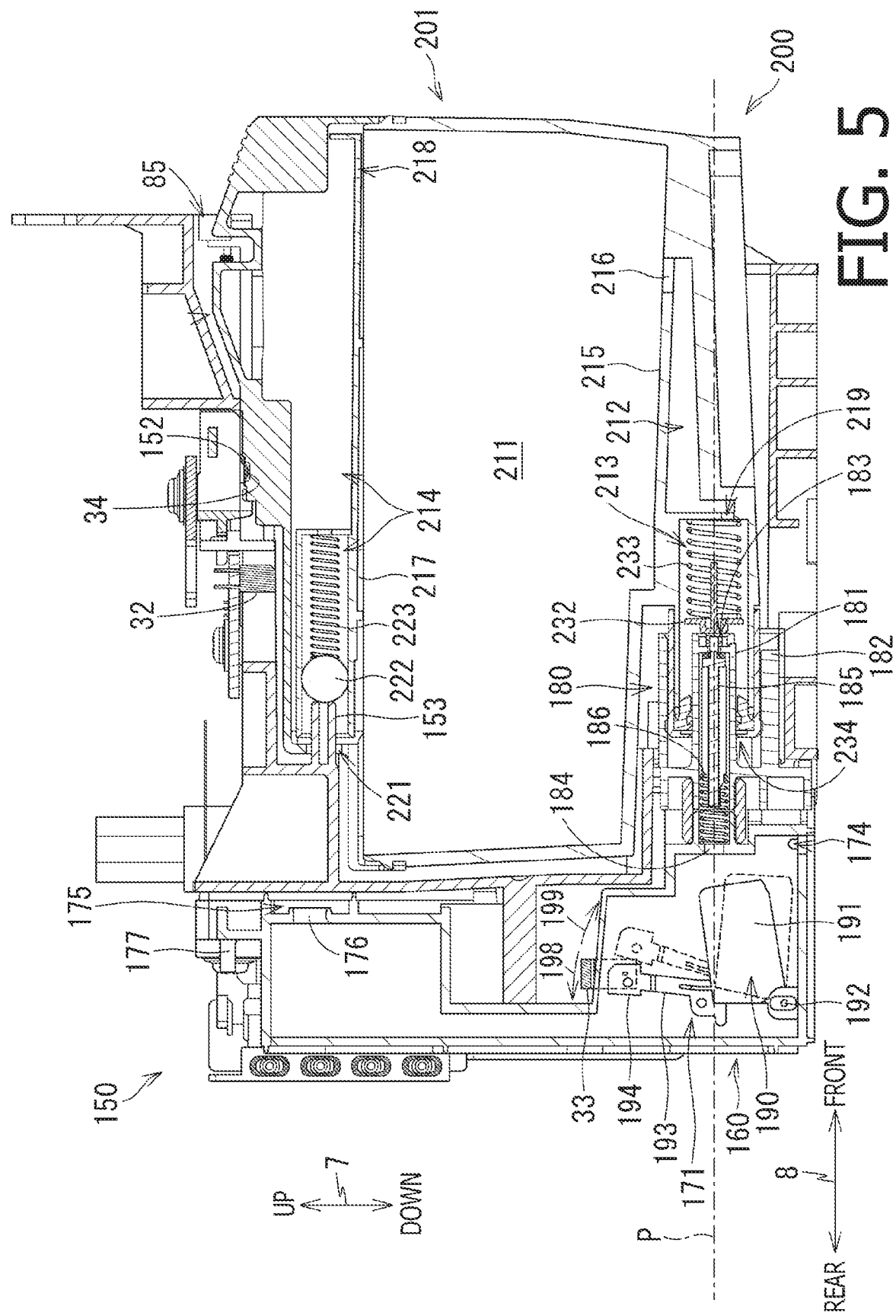

FIG. 5 is a cross-sectional view of the attachment case 150 with the cartridge 200 attached thereto in the printer 10 according to the embodiment of the present disclosure.

Figure 6:
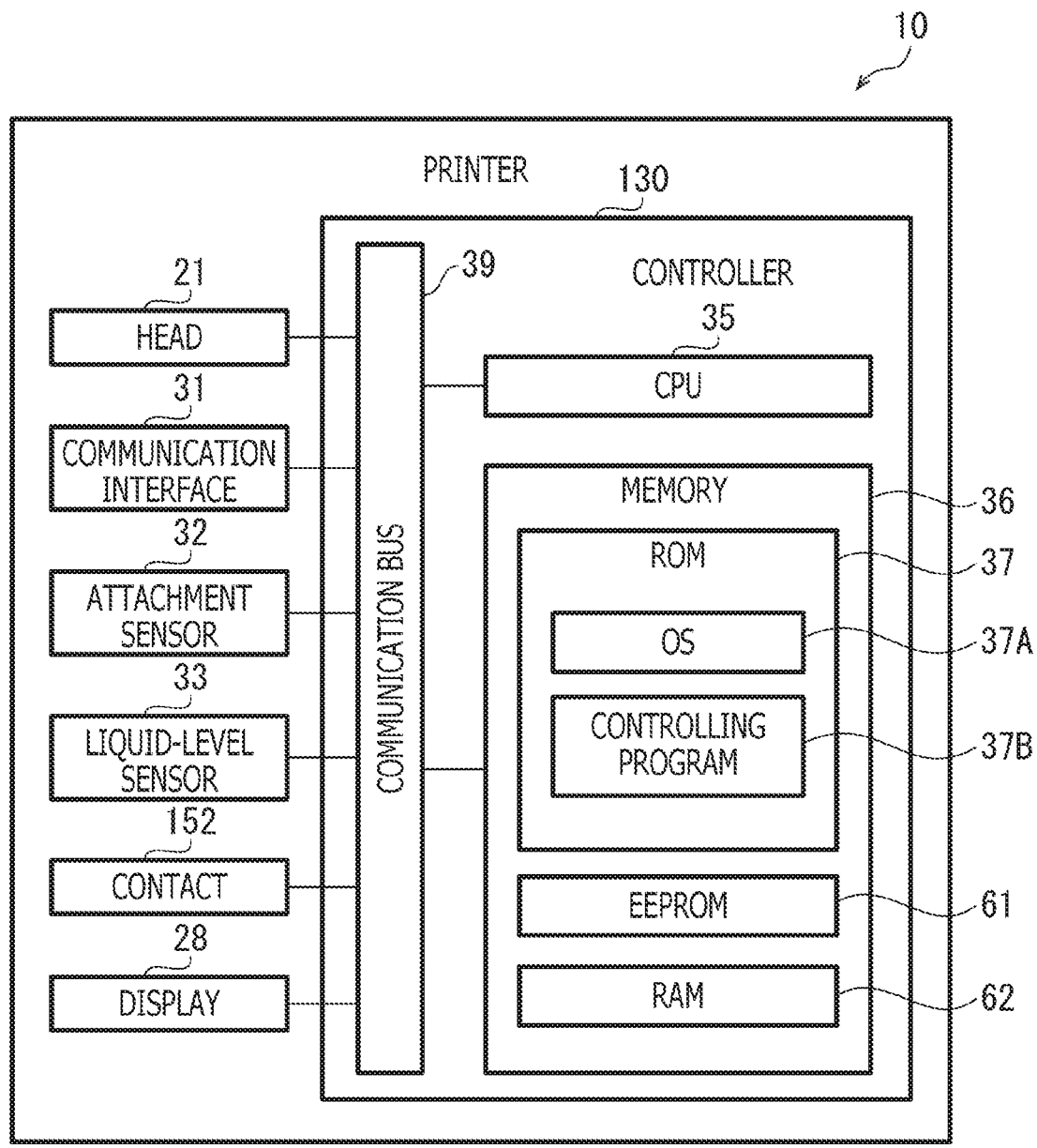

FIG. 6 is a block diagram to illustrate a functional configuration in the printer 10 according to the embodiment of the present disclosure.

Figure 7:
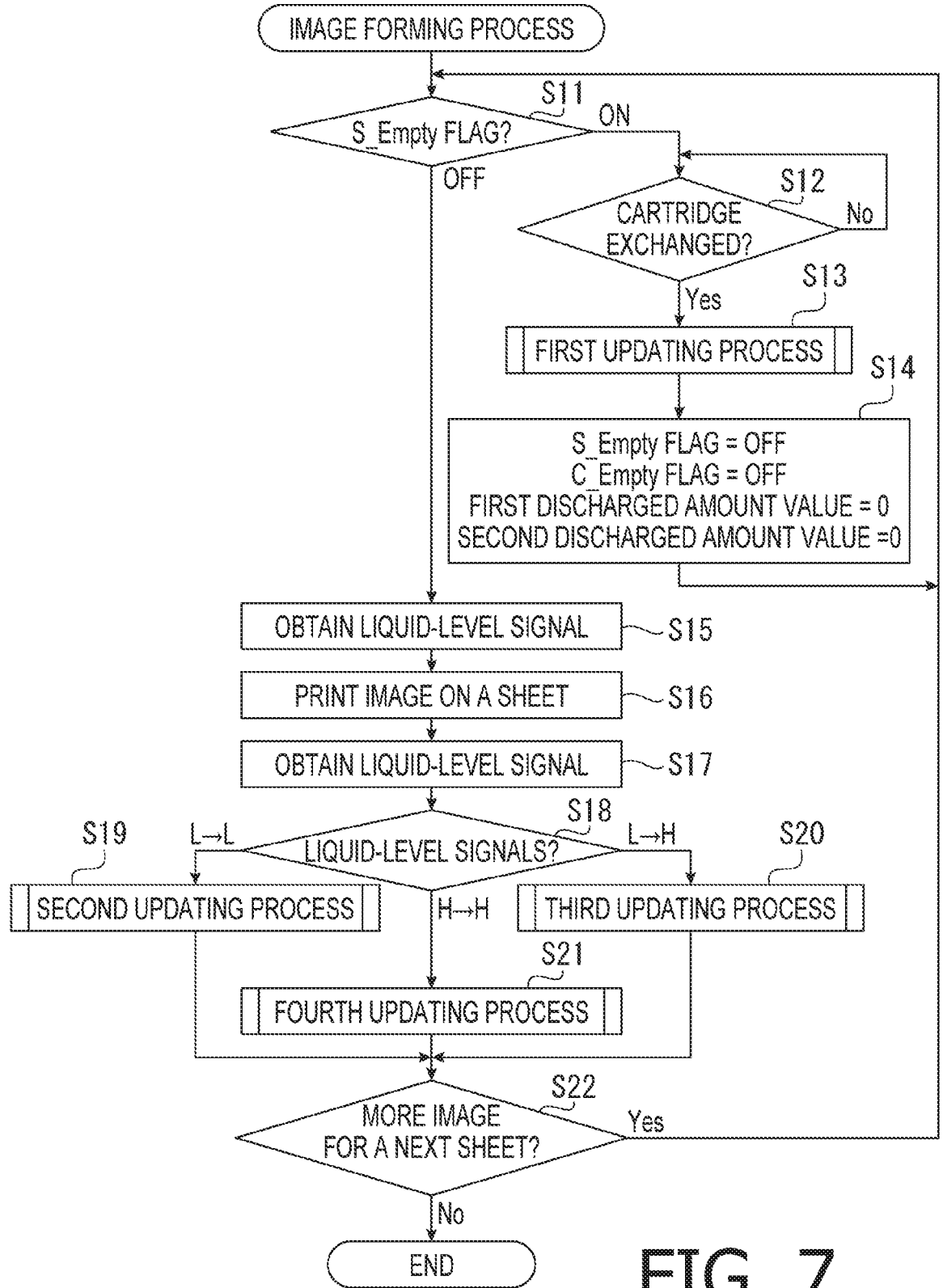

FIG. 7 is a flowchart to illustrate a flow of steps in an image forming process to be conducted in the printer 10 according to the embodiment of the present disclosure.

FIGS. 8A-8D are flowcharts to illustrate flows of steps in first, second, third, and fourth updating processes to be conducted in the printer 10 according to the embodiment of the present disclosure.

Figure 9:
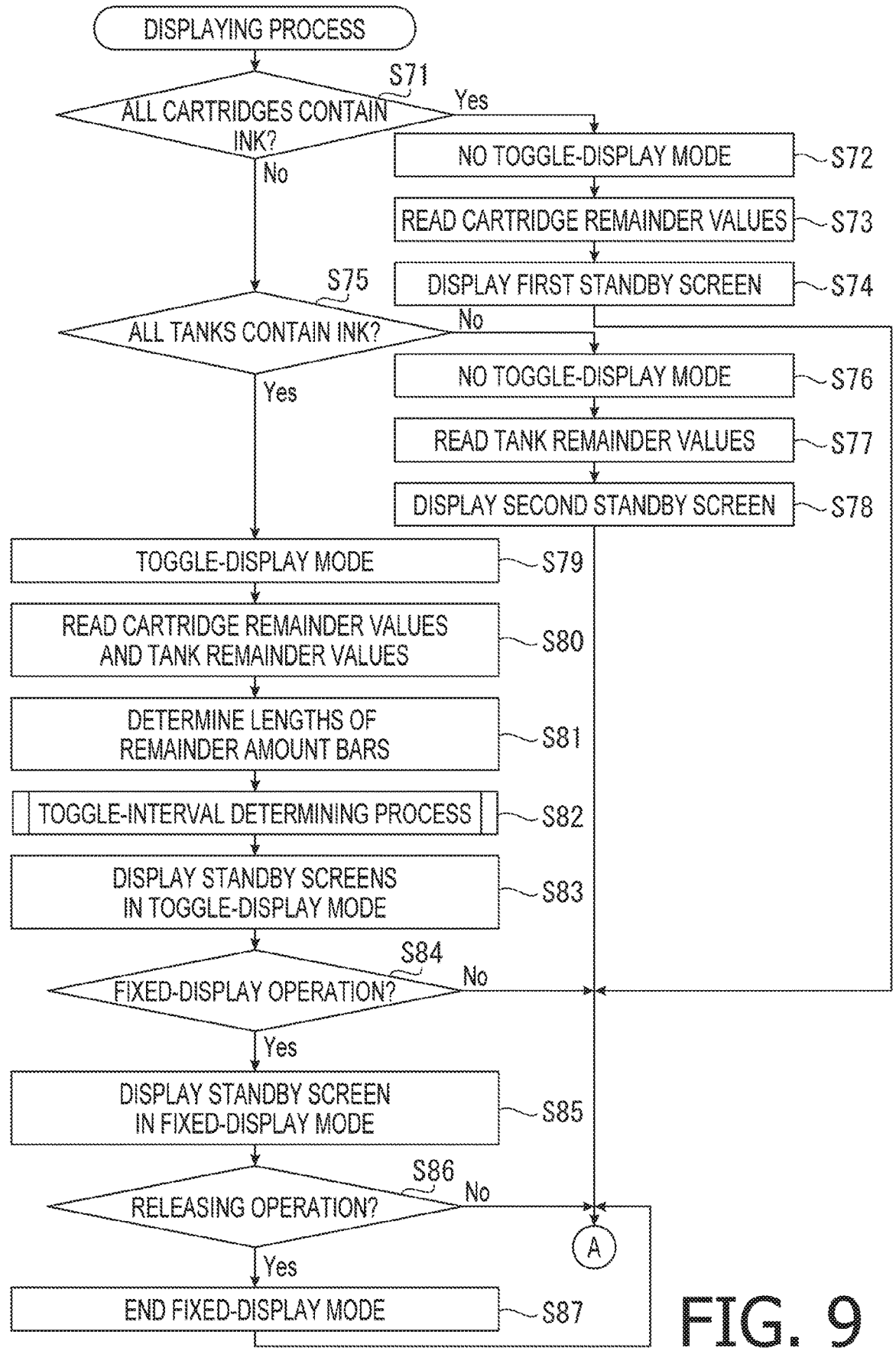

FIG. 9 is a part of a flowchart to illustrate a flow of steps in a displaying process according to the embodiment of the present disclosure.

Figure 10:
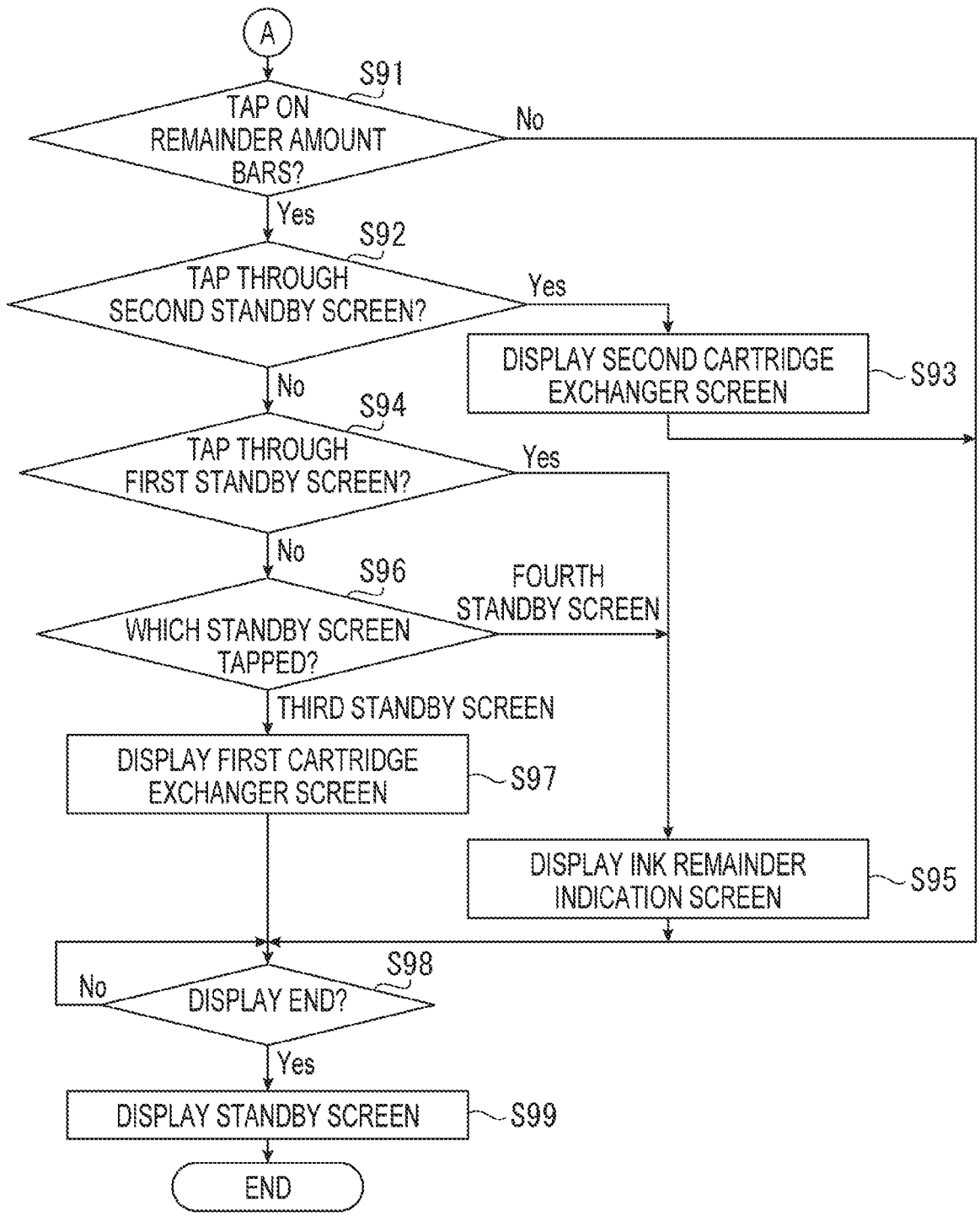

FIG. 10 is another part of the flowchart to illustrate the flow of steps in the displaying process to be conducted in the printer 10 according to the embodiment of the present disclosure.

Figure 11:
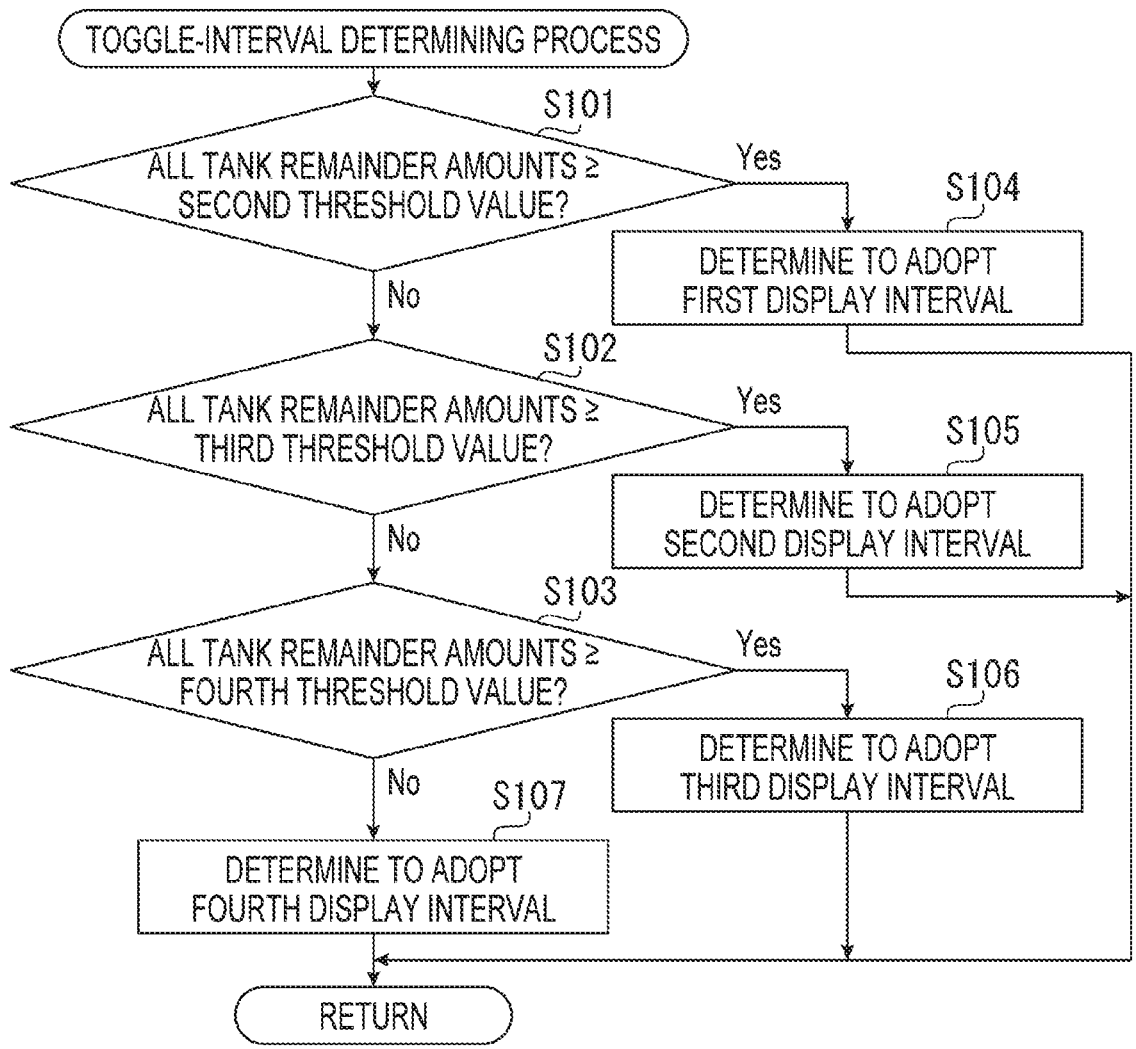

FIG. 11 is a flowchart to illustrate a flow of steps in a toggle-interval determining process to be conducted in the printer 10 according to the embodiment of the present disclosure.

Figure 12A:
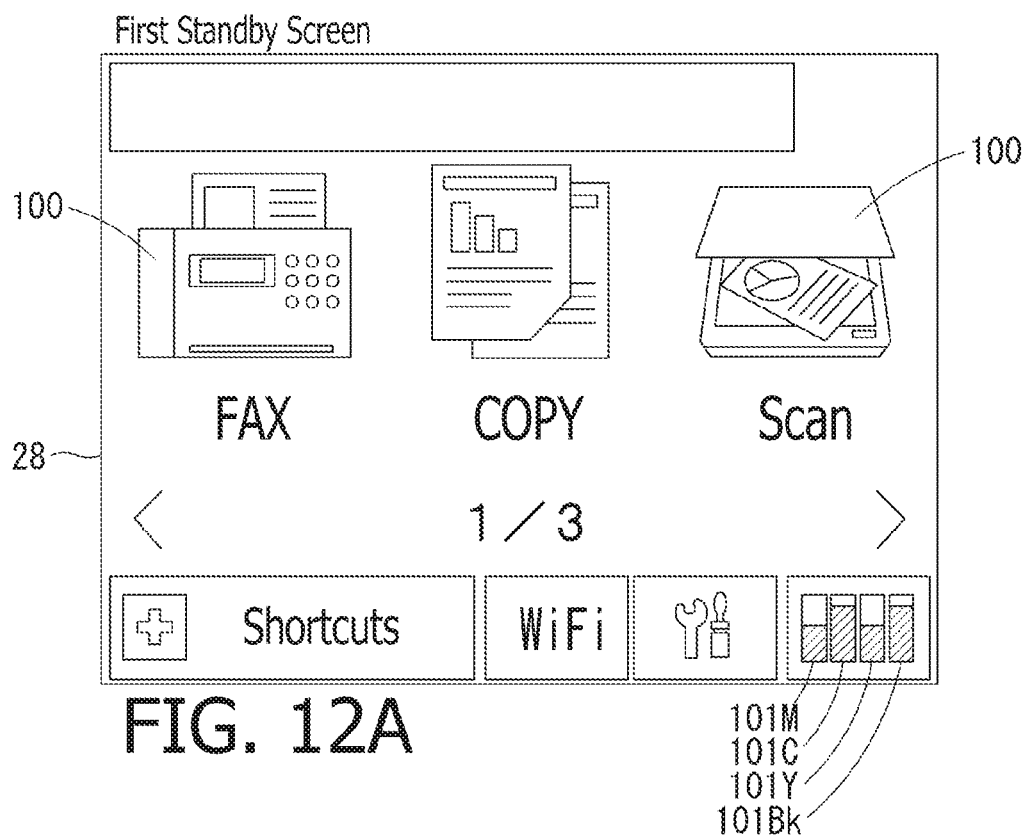
Figure 12B:
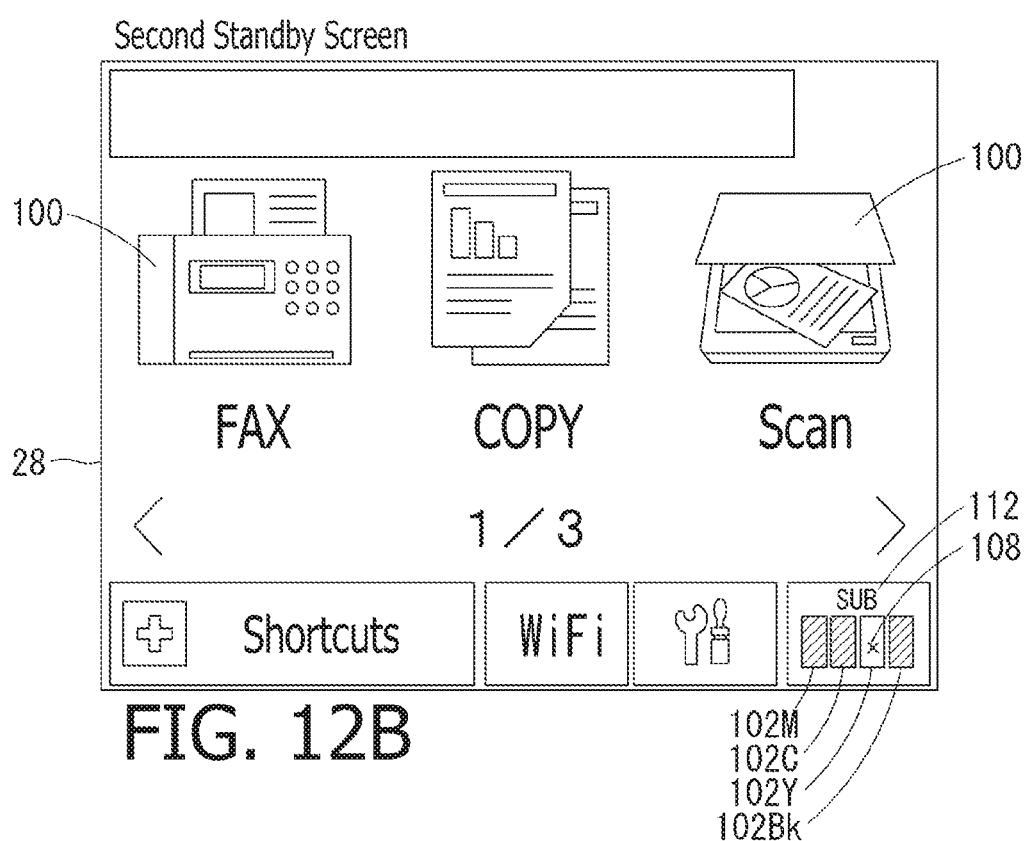

FIG. 12A is an illustrative view of a standby screen to be displayed in a display 28 in the printer 10, when cartridges contain inks, according to the embodiment of the present disclosure. FIG. 12B is an illustrative view of a standby screen to be displayed in the display 28 in the printer, when one of tanks is empty, according to the embodiment of the present disclosure.

Figure 13A:
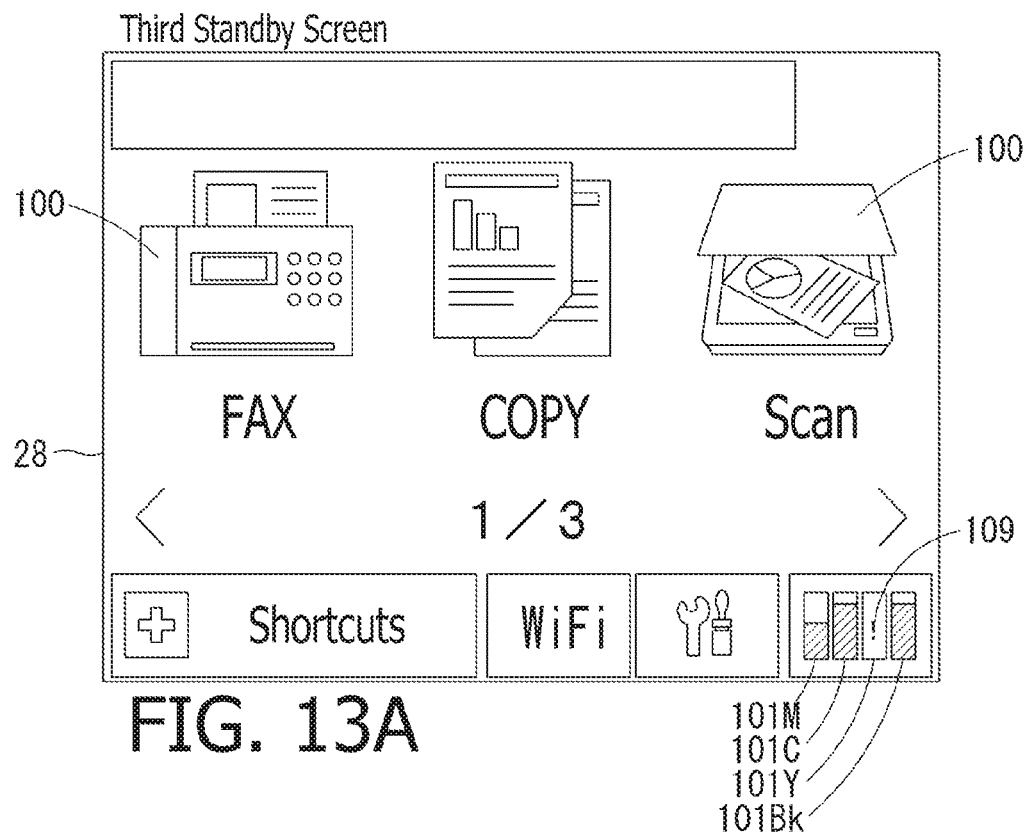
Figure 13B:
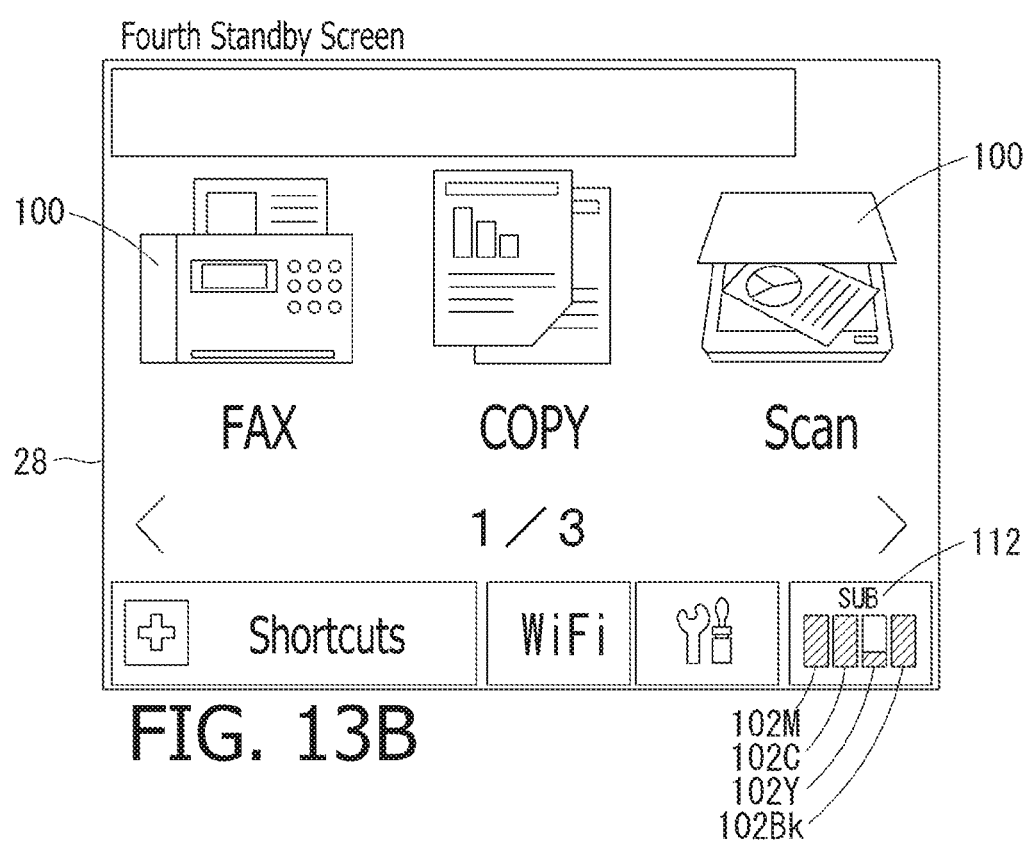

FIG. 13A is an illustrative view of a first standby screen, including indication of cartridge remainder amounts, to be displayed in the display 28 in the printer 10 according to the embodiment of the present disclosure. FIG. 13B is an illustrative view of a second standby screen, including indication of tank remainder amounts, to be displayed in the display 28 in the printer 10 according to the embodiment of the present disclosure.

Figure 14A:
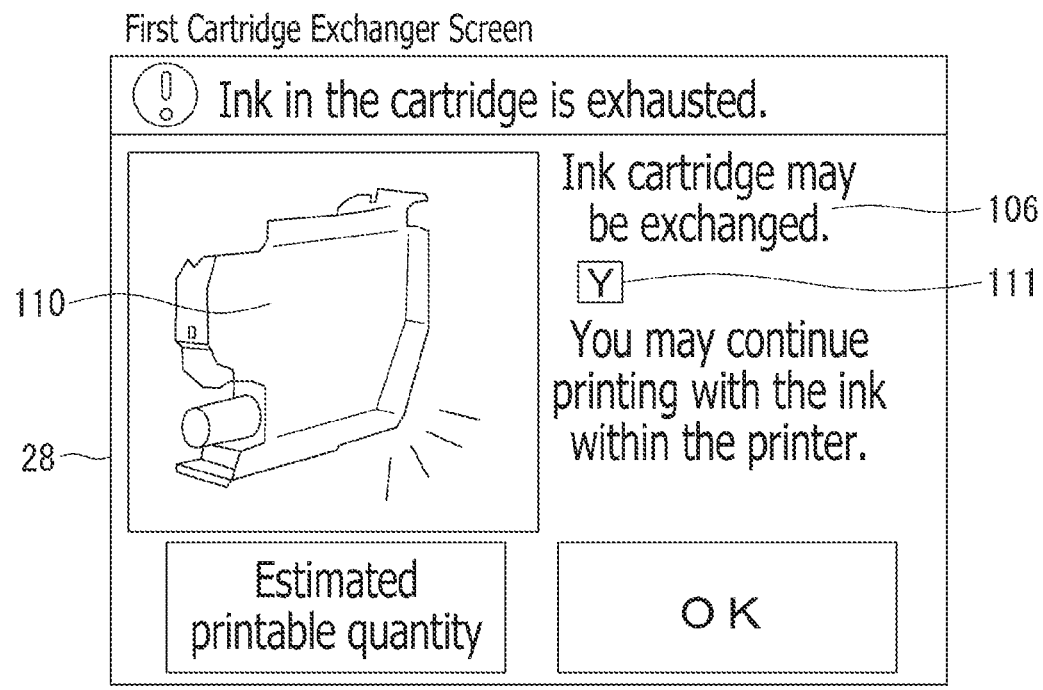
Figure 14B:
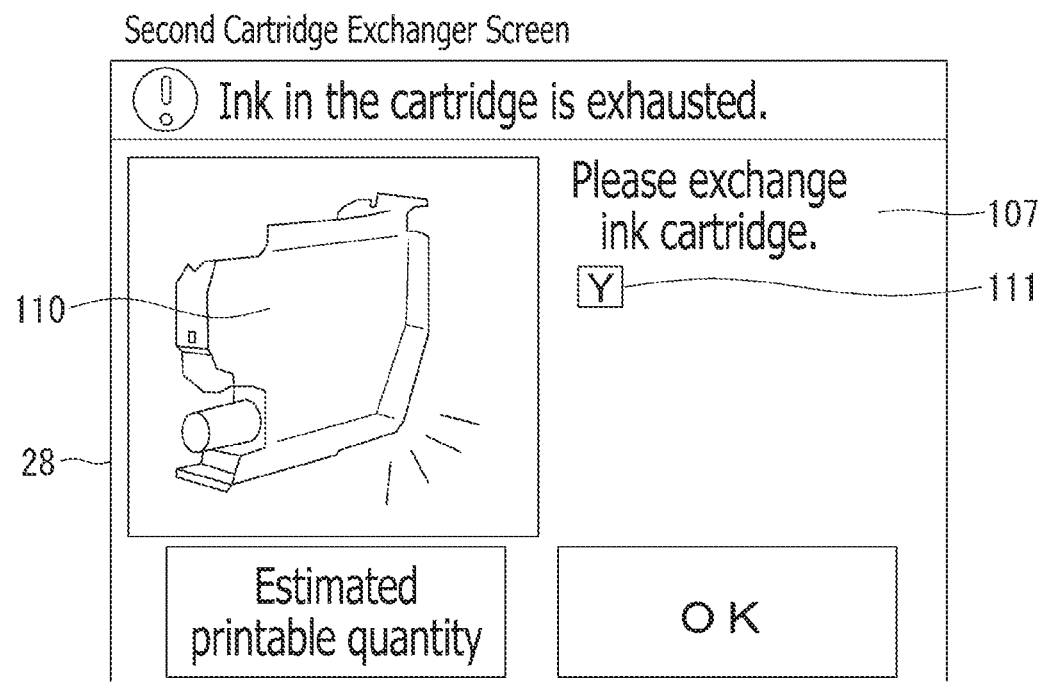

FIG. 14A is an illustrative view of a first cartridge exchanger screen to be displayed in the display 28 in the printer 10 according to the embodiment of the present disclosure. FIG. 14B is an illustrative view of a second cartridge exchanger screen to be displayed in the display 28 in the printer 10 according to the embodiment of the present disclosure.

Figure 15A:
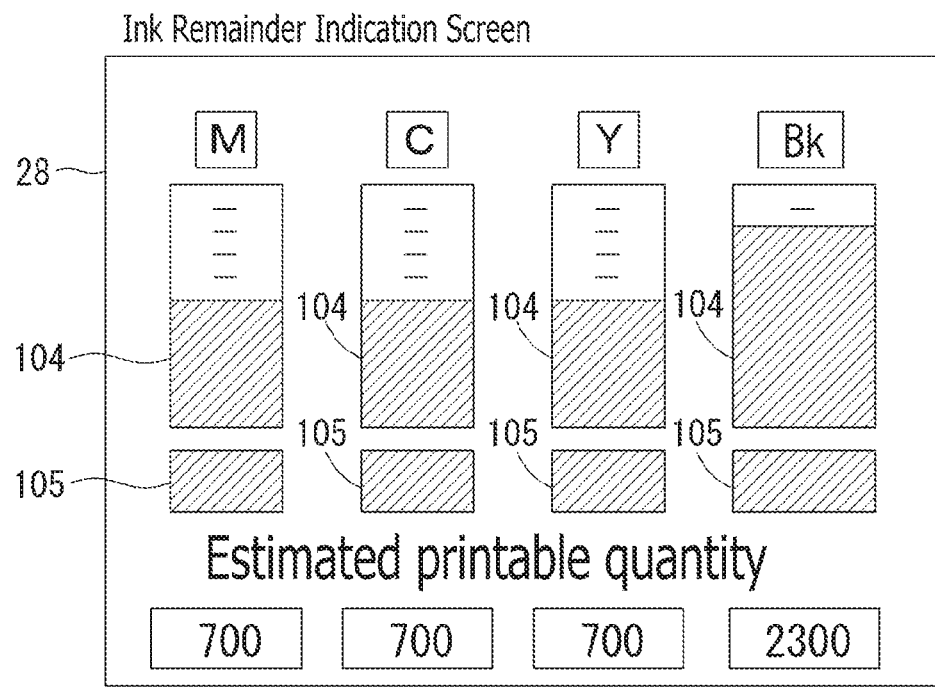
Figure 15B:
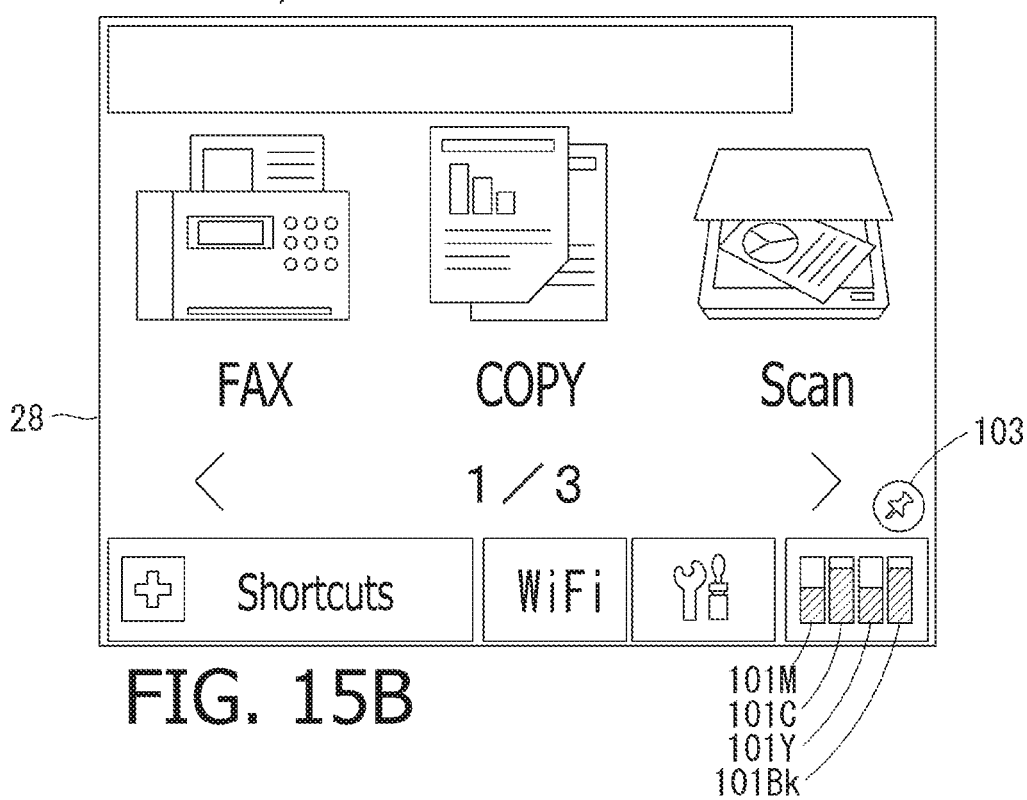

FIG. 15A is an illustrative view of an ink remainder indication screen to be displayed in the display 28 in the printer 10 according to the embodiment of the present disclosure. FIG. 15B is an illustrative view of a standby screen to be displayed in the display 28 in the printer 10 according to a first modified example of the embodiment of the present disclosure.

Figure 16A:
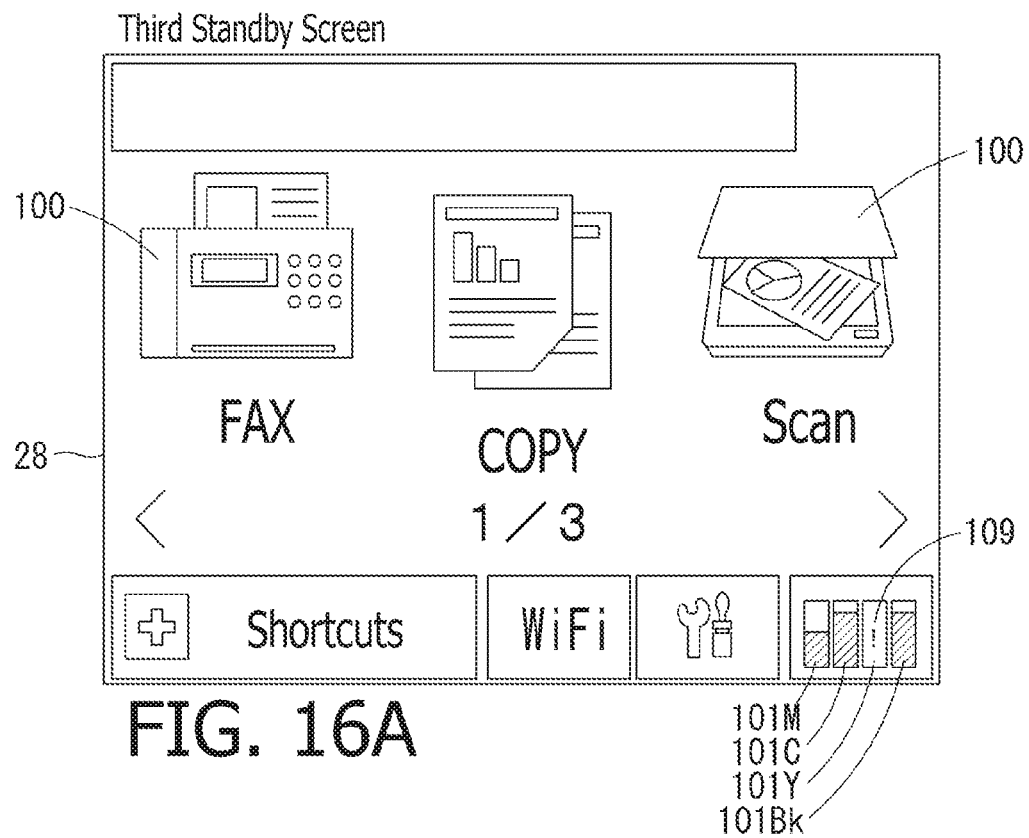
Figure 16B:
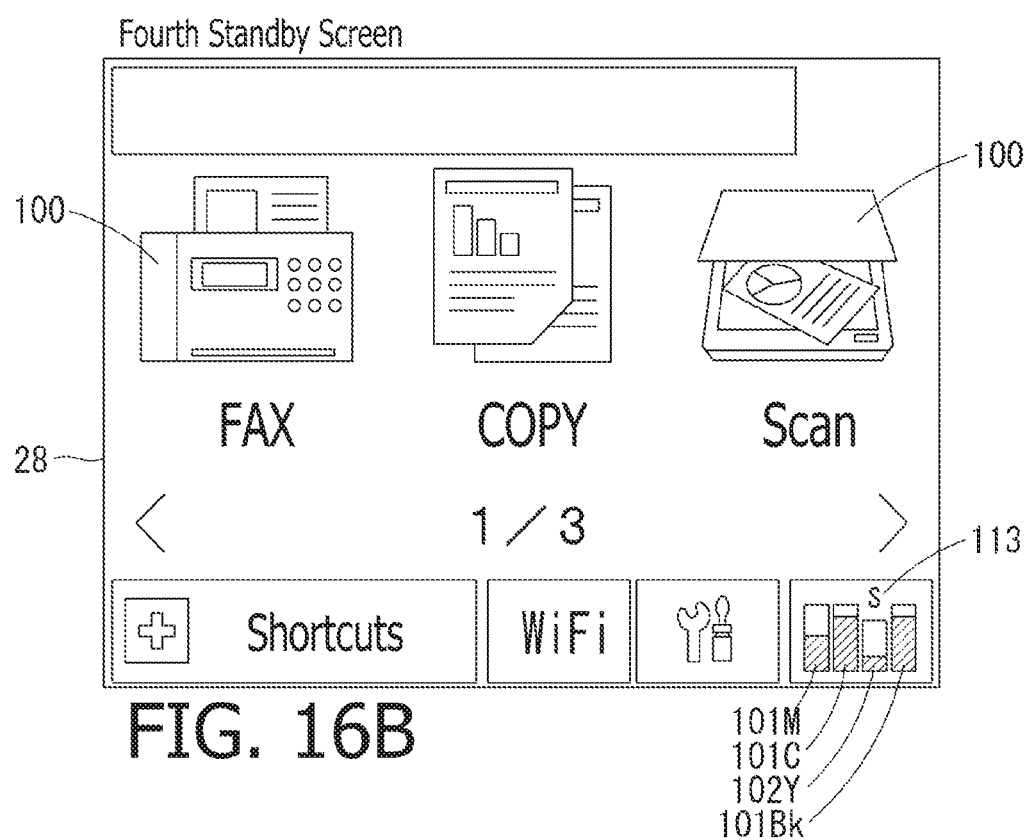

FIG. 16A is an illustrative view of a third standby screen, including indication of cartridge remainder amounts, to be displayed in the display 28 in a toggle-display mode in the printer 10 according to a second modified example of the embodiment of the present disclosure. FIG. 16B is an illustrative view of a fourth standby screen, including indication of tank remainder amounts, to be displayed in the display 28 in the toggle-display mode in the printer 10 according to a second modified example of the embodiment of the present disclosure.

DETAILED DESCRIPTION

Hereinafter, an exemplary embodiment according to the present disclosure will be described in detail with reference to the accompanying drawings. It is noted that various connections may be set forth between elements in the following description. These connections in general and, unless specified otherwise, may be direct or indirect and that this specification is not intended to be limiting in this respect. For example, an order to process steps in a flowchart described below may not necessarily be fixed but may be altered within a scope of the present invention.

Figure 1A:
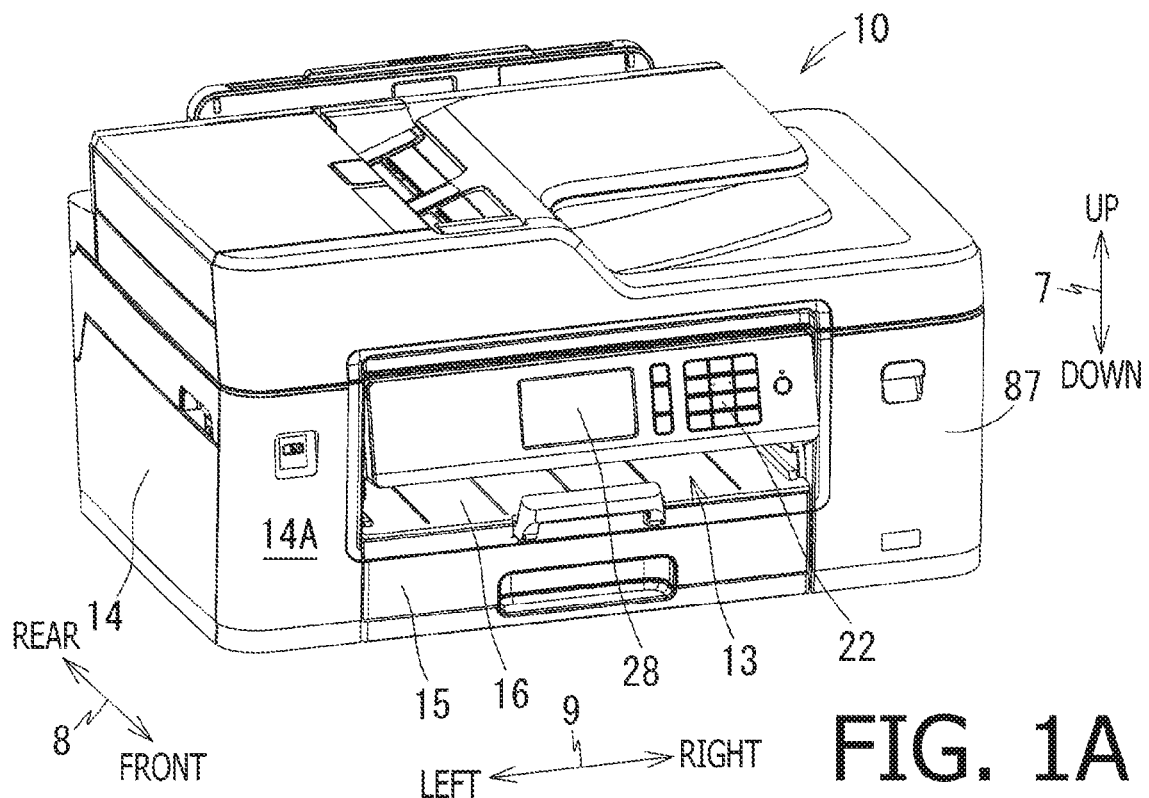
Figure 1B:
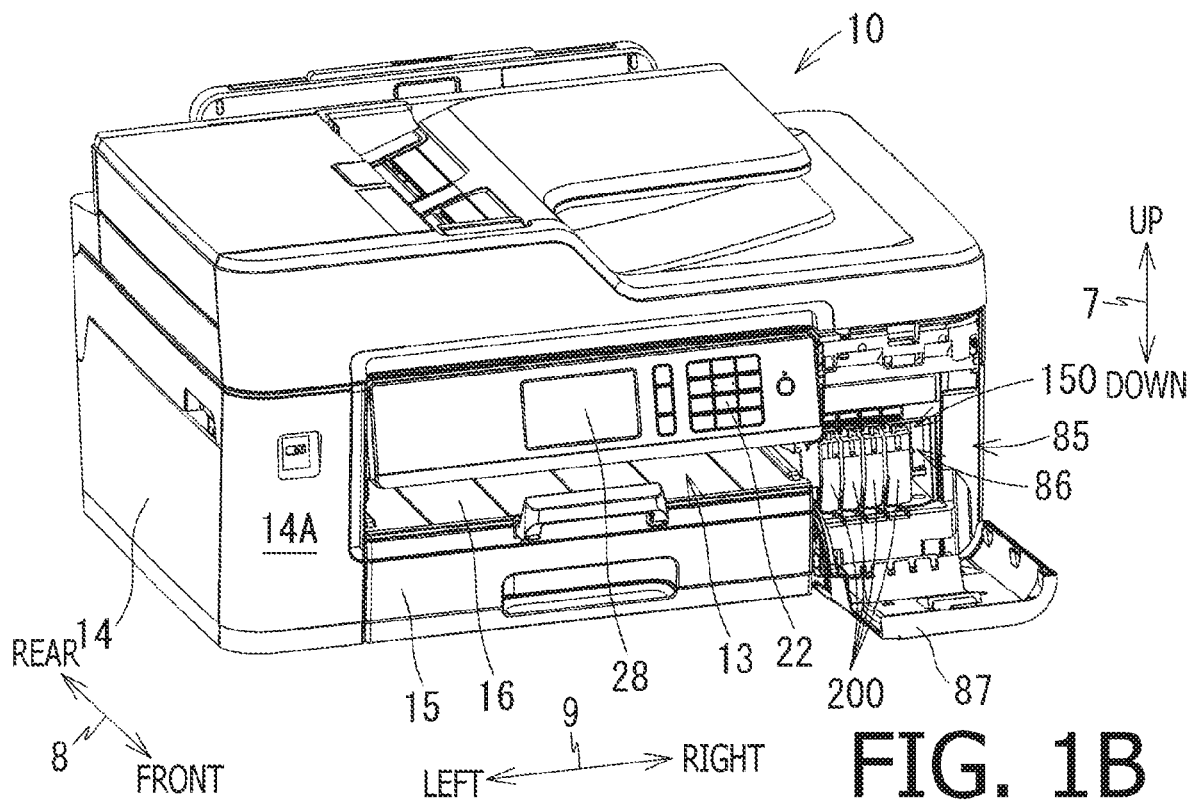

In the following paragraphs, described will be a printer 10 as shown in FIGS. 1A-1B that may consume liquid.

[Overall Configuration of the Printer 10]

The printer 10 may be an inkjet printer capable of forming images on sheets by discharging ink droplets at the sheets. The printer 10 may not necessarily be a single-functioned printer but may be a multifunction device having other functions such as a facsimile transmission function, a scanning function, and a copying function.

In the following description, positional relation within the printer 10 and each part or item included in the printer 10 will be mentioned on basis of a user's position to ordinarily use the printer 10 placed on a horizontal surface, as indicated by the bi-directionally pointing arrows in some of the drawings. For example, in FIG. 1A, a vertical axis between an upper side and a lower side in the drawing may be defined as a vertical direction 7. While a side, on which an opening 13 is arranged, is defined as a front side to the user, a horizontal axis between the front side and a rear side opposite from the front side may be defined as a front-rear direction 8. Further, a horizontal axis between a right-hand side and a left-hand side to the user when the user faces toward the front side of the printer 10 may be defined as a widthwise direction 9. The vertical direction 7, the front-rear direction 8, and the widthwise direction 9 intersect orthogonally to one another.

Figure 2:
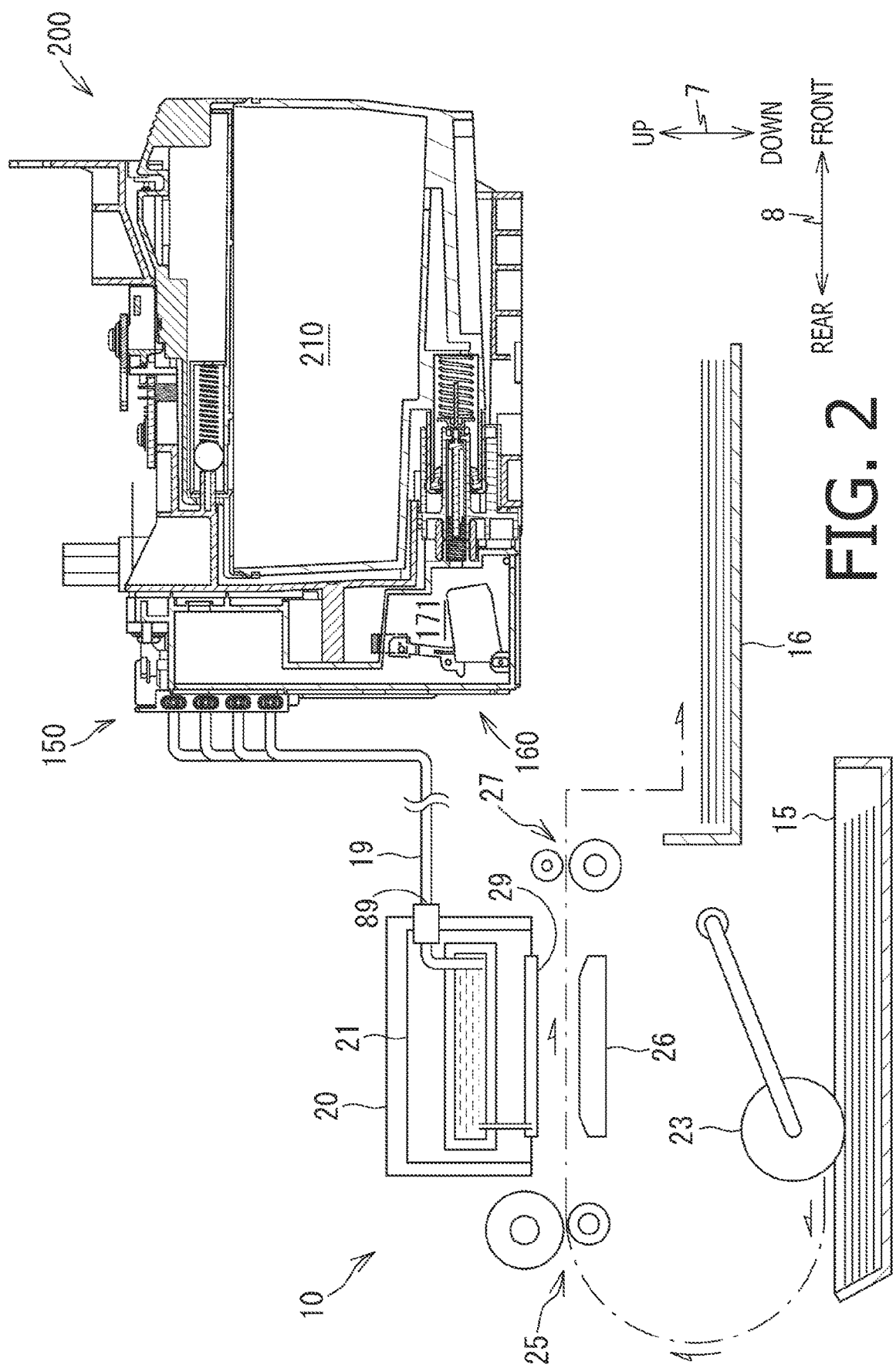
FIG. 2 is an illustrative cross-sectional view of the printer 10 according to the embodiment of the present disclosure.
Figure 3:
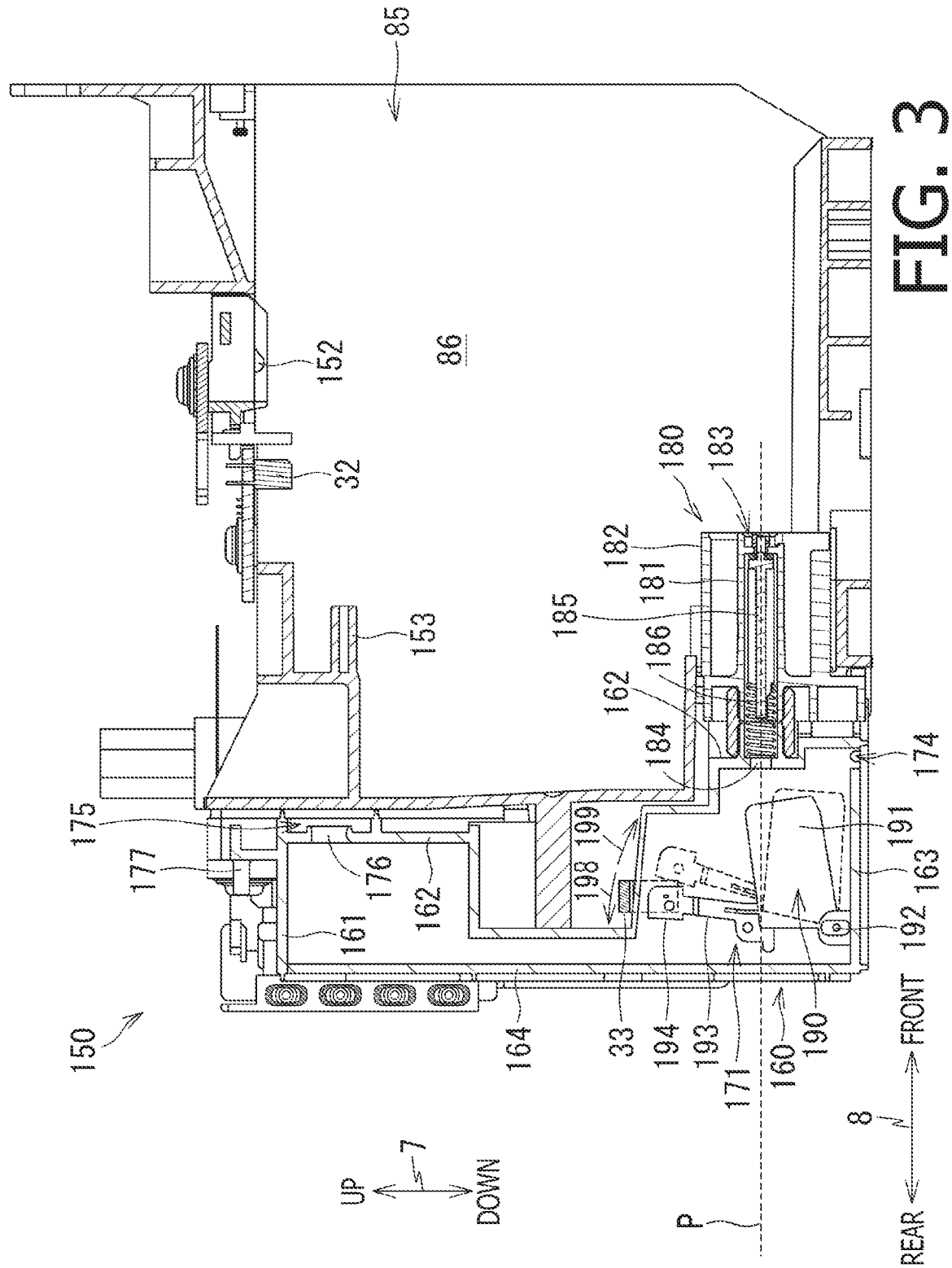
FIG. 3 is a cross-sectional view of an attachment case 150 in the printer 10 according to the embodiment of the present disclosure.

The printer 10 has a body 14, which is in an approximate shape of a rectangular box. Inside the body 14, as shown in FIGS. 2-3, arranged are a feeder tray 15, a feed roller 23, a conveyer roller 25, heads 21 each having a plurality of nozzles 29, a platen 26, an ejection roller 27, an ejection tray 16, an attachment case 150, and tanks 160.

The printer 10 may drive the feed roller 23 and the conveyer roller 25 to rotate and convey a sheet loaded in the feeder tray 15 to a position of the platen 26. The printer 10 controls the head 21 to discharge ink, which may be supplied from the tanks 160 through tubes 19, from the nozzles 29. Thus, the ink discharged from the nozzles 29 may land on the sheet and print an image on the sheet. The printer 10 may drive the ejection roller 27 to eject the sheet with the image printed thereon at the ejection tray 16.

The heads 21 are mounted on a carriage 20, which may reciprocate along a main scanning direction. The main scanning direction extends in parallel with the widthwise direction 9, i.e., in a direction of depth in FIG. 2, and intersects with a conveying direction, along which the sheet may be conveyed by the conveyer roller 25. The carriage 20 may be moved along the main scanning direction by a driving force from a motor (not shown). The printer 10 may control the conveyer roller 25 to pause and control the carriage 20 to move along the main scanning direction and the heads 21 to discharge the inks from the nozzles 29. Thereby, a row of image may be printed in a linear path on the sheet that faces with the head 21 while the heads 21 move along the main scanning direction. The linear path faces with the heads 21 while the heads 21 move along the main scanning direction. The printer 10 may further control the conveyer roller 25 to convey the sheet for a predetermined amount so that a next linear path in the sheet may face with the heads 21 and another row of image may be printed in the next linear path. Operations of printing a row of image and conveying the sheet for a next linear path may be repeated alternately for a plurality of times to print an image on the sheet.

[Display 28]

The body 14 includes a display 28, which is located on a front side of the body 14. The display 28 may be a touch panel, which includes a touch sensor laid over a display panel. Alternatively or additionally to the display 28, arranged on the front side of the body 14 may be a display panel, through which information is displayable, and buttons, through which a user's input is acceptable.

[Cover 87]

As shown in FIGS. 1A-1B, on a front face 14A of the body 14, at a rightward area, formed is an opening 85. The body 14 has a cover 87. The cover 87 is pivotable between a covering position, in which the opening 85 is covered (see FIG. 1A), and an open position, in which the opening 85 is exposed open (see FIG. 1B). The cover 87 may be pivotably supported by, for example, a lower edge of the body 14, to pivot about a pivot axis, which extends in the widthwise direction 9. Inside the body 14, in an attachment cavity 86, which continues from the opening 85 in the front-rear direction, arranged is the attachment case 150. To the attachment case 150, cartridges 200 are detachably attachable.

[Attachment Case 150]

The attachment case 150 as shown in FIG. 3 includes a contact 152, a rod 153, an attachment sensor 32, a liquid-level sensor 33, and a locking pin 156. The attachment case 150 may accommodate a plurality of, e.g., four (4), cartridges 200 each containing ink in a different color, which may be, for example, black, cyan, magenta, and yellow. In this regard, the attachment case 150 has a set of the contact 152, the rod 153, the attachment sensor 32, and the liquid-level sensor 33, for each one of the four cartridges 200. In the following paragraphs, the terms "the contact 152," "the rod 153," "the attachment sensor 32," and "the liquid-level sensor 33" may mean four (4) contacts 152, four (4) rods 153, four (4) attachment sensors 32, and four (4) liquid-level sensors 33, for the cartridges 200 for black, cyan, magenta, and yellow. Meanwhile, a quantity of the cartridges 200 to be mounted in the attachment case 150 may not necessarily be limited to four but may be less than four, e.g., one (1), or more than four (4). In the following paragraphs, among the four identical items, e.g., the contacts 152, the rods 153, the attachment sensors 32, and the liquid-level sensors 33, solely one of them may be described representatively.

The attachment case 150 has a shape of a box having an inner cavity to accommodate the cartridges 200. The inner cavity in the attachment case 150 is limited by a ceiling, a bottom, a rear wall, and a pair of side walls, which define an upper end, a lower end, a rear end in the front-rear direction 8, and widthwise ends in the widthwise direction 9, respectively. A frontward part of the attachment case 150 across the inner cavity from the rear wall in the front-rear direction 8 forms the opening 85 in the body 14. When the cover 87 is located at the open position, the inner cavity in the attachment case 150 may be exposed outward through the opening 85.

The cartridges 200 may be attached to and removed from the attachment case 150 through the opening 85 in the body 14. In particular, each cartridge 200 may be pushed rearward through the opening 85 to be attached to the attachment case 150 and may be pulled frontward through the opening 85 to be removed from the attachment case 150.

[Contacts 152]

The contacts 152 are arranged on the ceiling of the attachment case 150 and protrude downward in the inner cavity from the ceiling. Each contact 152 is located at a position, where the contact 152 may contact electrodes 248 on the cartridge 200, which will be described further below, when the cartridge 200 is attached to the attachment case 150. The contact 152 is electrically conductive and resiliently deformable in the vertical direction 7. The contact 152 is electrically connected with the controller 130. In other words, the contact 152 may serve to connect the controller 130 with an IC chip 34 in the cartridge 200, which will be described further below.

[Rods 153]

The rods 153 protrude frontward from the rear wall of the attachment case 150. Each rod 153 is located at a position higher than a joint 180, which will be described further below, on the rear wall of the attachment case 150. The rod 153 may enter an air valve compartment 214 in the cartridge 200 through an air communication hole 221, which will be described further below, while the cartridge 200 is in transition to be attached to the attachment case 150. The rod 153 in the air valve compartment 214 allows the air valve compartment 214 to be in fluid communication with the atmosphere.

[Attachment Sensors 32]

The attachment sensors 32 are arranged on the ceiling of the attachment case 150. Each attachment sensor 32 may detect a condition of a corresponding one of the cartridges 200, i.e., whether the cartridge 200 is attached to the attachment case 150 or not. The attachment sensor 32 may include a light emitter and a light receiver, which are not shown but may be spaced apart from each other in the widthwise direction 9. When the cartridge 200 is attached to the attachment case 150, a light-blocking rib 245 on the cartridge 200 is located between the light emitter and the light receiver in the attachment sensor 32. In other words, the light emitter and the light receiver in the attachment sensor 32 are arranged to face each other across the light-blocking rib 245 on the cartridge 200 when the cartridge 200 is attached to the attachment case 150.

The attachment sensor 32 outputs different signals depending on light-receiving conditions of the light receiver, i.e., whether or not the light receiver receives the light emitted in the widthwise direction 9 from the light emitter. The signals output from the light receiver indicating the light-receiving condition of the light receiver in the attachment sensor 32 will be called as an attachment signal. The attachment sensor 32 may output a lower-leveled signal to the controller 130 in response to, for example, an intensity of the light received in the light receiver being less than a threshold intensity. On the other hand, the attachment sensor 32 may output a higher-leveled signal to the controller 130 in response to an intensity of the light received in the light receiver being greater than or equal to the threshold intensity.

[Liquid-Level Sensors 33]

Each of the liquid-level sensors 33 may detect a position of a detectable part 194 in an actuator 190, which will be described further below. In particular, the liquid-level sensor 33 may detect whether or not the detectable part 194 is at a detectable position. The liquid-level sensor 33 includes a light emitter and a light receiver, which are not shown but may be spaced apart from each other in the widthwise direction 9. In other words, when the detectable part 194 is at the detectable position, the detectable part 194 is located at a position between the light emitter and the light receiver in the liquid-level sensor 33. On the other hand, when the detectable part 194 is outside the detectable position, the detectable part 194 is not located between the light emitter and the light receiver in the liquid-level sensor 33. The liquid-level sensor 33 may output different signals depending on light-receiving conditions of the light receiver, i.e., whether or not the light receiver receives the light emitted from the light emitter. The liquid-level sensor 33 may, for example, in response to an intensity of the light received in the light receiver being smaller than a threshold intensity, output a lower-leveled signal to the controller 130. On the other hand, in response to an intensity of the light received in the light receiver being greater than or equal to the threshold intensity, the liquid-level sensor 33 may output a higher-leveled signal to the controller 130.

[Tanks 160]

The printer 10 has four (4) tanks 160 for the four (4) cartridges 200. In particular, the printer 10 has four (4) sets of tanks 160 and cartridges 200: a tank 160 to store the magenta ink, which corresponds to a cartridge 200 to store the magenta ink; a tank 160 to store the cyan ink, which corresponds to a cartridge 200 to store the cyan ink; a tank 160 to store the yellow ink corresponding to a cartridge 200 to store the yellow ink; and a tank 160 to store the black ink, which corresponds to a cartridge 200 to store the black ink.

While the four tanks 160 may be in similar or identical configuration to one another, in the following paragraphs, one of the tanks 160 may be representatively described.

The tanks 160 are located at positions rearward with respect to the rear wall of the attachment case 150. Each tank 160 has, as shown in FIG. 3, an upper wall 161, a front wall 162, a lower wall 163, a rear wall 164, and a pair of sidewalls which are not shown. The front wall 162 may include a plurality of walls that are in different positions from one another in the front-rear direction 8. Inside the tank 160, formed is a liquid compartment 171.

Among the walls that form the tank 160, at least a part that faces the liquid-level sensor 33 is translucent. Therefore, the light emitted from the liquid-level sensor 33 may be transmitted through the wall that faces the liquid-level sensor 33. The rear wall 164 may include, at least partly, a sheet of film fused to edges of the upper wall 161, the lower wall 163, and the sidewalls. Meanwhile, the sidewalls of the tank 160 may be unified with the attachment case 150 or may be independent from the attachment case 150. The tanks 160 adjoining along the widthwise direction 9 are divided by bulkheads, which are not shown.

The liquid compartment 171 is continuous with an ink channel, which is not shown, through a liquid outlet 174. A lower end of the liquid outlet 174 is defined by the lower wall 163, which defines the lower end of the liquid compartment 171. The liquid outlet 174 is located to be lower than the joint 180, and in particular, a lower end of a through hole 184. The ink channel continuous with the liquid outlet 174 is continued to the tube 19. Therefore, the liquid compartment 171 is continuous with the head 21 through the liquid outlet 174, the ink channel, and the tube 19. In other words, the ink stored in the liquid compartment 171 may be supplied to the head 21 through the liquid outlet 174, the ink channel, and the tube 19. The ink channel and the tube 19, which are continuous with the liquid outlet 174, are continued to the liquid compartment 171 at one end, i.e., the liquid outlet 174 shown in FIG. 3, and to the head 21 at the other end 89 (see FIG. 2).

The liquid compartment 171 is in fluid communication with the atmosphere through the air communication compartment 175. In particular, the air communication compartment 175 is continuous with the liquid compartment 171 though a through hole 176, which is formed through the front wall 162 of the tank 160. Moreover, the air communication compartment 175 is continuous with the atmosphere outside the printer 10 through an air communication port 177 and a tube, which is now shown but is connected with the air communication port 177. In other words, the air communication compartment 175 is in fluid communication with the liquid compartment 171 at one end, i.e., at the through hole 176, and to the atmosphere outside the printer 10 at the other end, i.e., at the air communication port 177. Meanwhile, the air communication compartment 175 is continuous with the atmosphere through the air communication port 177 and the tube which is not shown.

The attachment case 150 and each tank 160 forms a container set. In other words, the printer 10 has four (4) container sets for the tanks 160 for magenta, cyan, yellow, and black. Meanwhile, a quantity of the container sets may not necessarily be limited to four but may be less than four, e.g., one, or more than four.

[Joints 180]

Each of the joints 180 includes, as shown in FIG. 3, a needle 181 and a guide 182. The needle 181 is tubular and has an inner cavity serving as a fluid channel therein. The needle 181 protrudes frontward from the front wall 162, which defines the front end of the liquid compartment 171. The needle 181 is formed to have an opening 183 at a front end thereof. The fluid channel inside the needle 181 is continuous with the liquid compartment 171 through the through hole 184 formed in the front wall 162. The needle 181 is in fluid communication with the atmosphere outside the tank 160 at one end, i.e., through the opening 183, and with the liquid compartment 171 at the other end, i.e., through the through hole 184. The guide 182 is in a cylindrical shape arranged around the needle 181. The guide 182 protrudes frontward from the front wall 162 and is open frontward at the front end thereof.

In the inner cavity inside the needle 181, arranged are a valve 185 and a coil spring 186. The valve 185 is movable in the inner cavity inside the needle 181 between a closed position and an open position along the front-rear direction 8. The valve 185 at the closed position closes the opening 183 and at the open position opens the opening 183. The coil spring 186 urges the valve 185 in a direction to move from the open position toward the closing position, i.e., frontward, along the front-rear direction 8.

[Actuators 190]

In each liquid compartment 171, as shown in FIG. 3, arranged is an actuator 190. The actuator 190 is pivotably supported by a supporting member, which is not shown but is arranged in the liquid compartment 171, to pivot along directions indicated by counterclockwise and clockwise arrows 198, 199 (see FIG. 3). The actuator 190 may pivot between a position in a first condition, as indicated by solid lines, and a position in a second condition, as indicated by broken lines, in FIG. 3. Meanwhile, the actuator 190 is restricted by a stopper, which is not shown, e.g., an inner wall in the liquid compartment 171, from pivoting in the direction indicated by the counterclockwise arrow 198. The actuator 190 includes a float 191, shafts 192, an arm 193, and the detectable part 194.

The float 191 is made of a material, of which specific gravity is smaller than the ink to be stored in the liquid compartment 171. The shafts 192 protrude along the widthwise direction 9 from a rightward face and a leftward face of the float 191. The shafts 192 are inserted in holes, which are not shown but are formed in the supporting member for the actuator 190. Thereby, the actuator 190 is pivotably supported by the supporting member to pivot about the shafts 192. The arm 193 extends upward from the float 191. The detectable part 194 is arranged at a tip end of the arm 193. In other words, the arm 193 is located between the detectable part 194 and the shafts 192. The detectable part 194 may be a piece of plate spreading along the vertical direction 7 and the front-rear direction 8. The detectable part 194 is either made of a material or in a color that blocks the light emitted from the light emitter of the liquid-level sensor 33.

When a surface level of the ink remaining in the liquid compartment 171 is higher than or equal to a threshold position P, the actuator 190, pivoted in the direction of the counterclockwise arrow 198 by its buoyancy, is held by the stopper at a detectable position indicated by the solid lines in FIG. 3. On the other hand, when the surface level of the ink in the liquid compartment 171 descends to be lower than the threshold position P, the actuator 190 pivots in the direction of the clockwise arrow 199. Therefore, the detectable part 194 in the actuator 190 moves to a position different from the detectable position. In other words, the detectable part 194 being a part of the actuator 190 moves to a position corresponding to an amount of the ink remaining in the liquid compartment 171.

The threshold position P may be at a same height as an axial center of the needle 181 in the vertical direction 7 and at a same height as a center of an ink supplier port 234, which will be described further below. However, the threshold position P is not necessarily limited as long as the threshold position P is higher than the liquid outlet 174. For example, the threshold position P may be at a same height as an upper end or a lower end of the inner cavity in the needle 181 or may be at a same height as an upper end or a lower end of the ink supplier port 234.

When the level of the ink in the liquid compartment 171 is higher than or equal to the threshold position P, the light emitted from the light emitter in the liquid-level sensor 33 is blocked by the detectable part 194 located at the detectable position. Therefore, the light from the light emitter may not reach the light receiver, and the liquid-level sensor 33 may output a lower-leveled signal to the controller 130. On the other hand, when the level of the ink in the liquid compartment 171 is lower than the threshold position P, the light emitted from the light emitter may reach the light receiver; therefore, the liquid-level sensor 33 may output a higher-leveled signal to the controller 130. In other words, when the signal from the liquid-level sensor 33 is the lower-leveled signal, the level of the ink in the liquid compartment 171 is higher than or equal to the threshold position P. On the other hand, when the signal from the liquid-level sensor 33 is the higher-leveled signal, the level of the ink in the liquid compartment 171 is lower than the threshold position P. Thus, the controller 130 may detect the level of the ink in the liquid compartment 171, whether the level of the ink is higher than or equal to or lower than the threshold position P, based on the signal output from the liquid-level sensor 33.

[Cartridges 200]

Figure 4A:
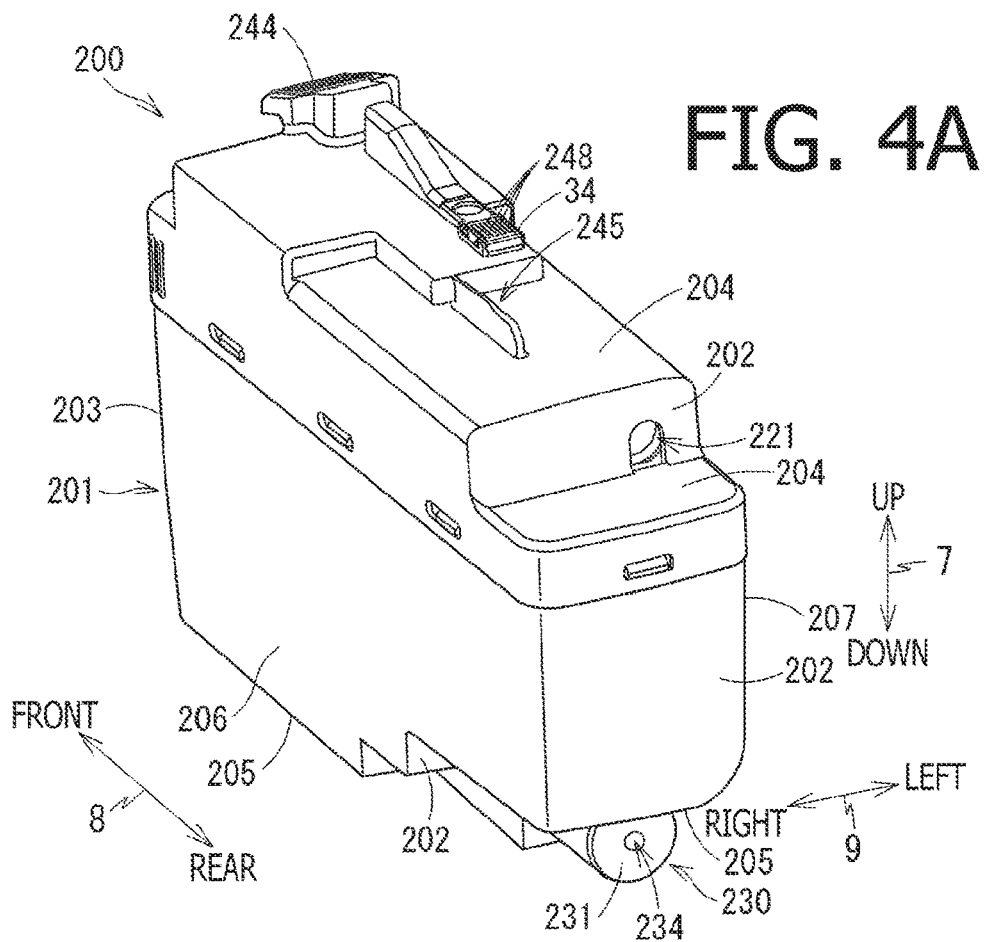
FIGS. 4A and 4B are a perspective view and a cross-sectional view of a cartridge 200 for the printer 10 according to the embodiment of the present disclosure.

The cartridges 200 are containers, each having the liquid compartment 210 (see FIG. 2) to store liquid, e.g., the ink. The liquid compartment 210 is defined by walls that may be made of, for example, resin. The cartridge 200 may be in a shape thinner in the widthwise direction 9, and of which dimensions in the vertical direction 7 and the front-rear direction 8 are greater than a dimension in the widthwise direction 9, as shown in FIG. 4A. The cartridges 200 to store inks in different colors may be either in a same shape or in different shapes. At least a part of the walls that form each cartridge 200 is translucent. Therefore, the user may visually recognize the level of the ink remaining in the liquid compartment 210 from the outside through the translucent part.

Each cartridge 200 has a body 201 and a supplier tube 230. The body 201 includes a rear wall 202, a front wall 203, an upper wall 204, a lower wall 205, and a pair of sidewalls 206, 207. The rear wall 202 may include a plurality of walls that are in different positions from one another in the front-rear direction 8. The upper wall 204 may include a plurality of walls that are in different positions from one another in the vertical direction 7. The lower wall 205 may include a plurality of walls that are in different positions from one another in the vertical direction 7.

Figure 4B:
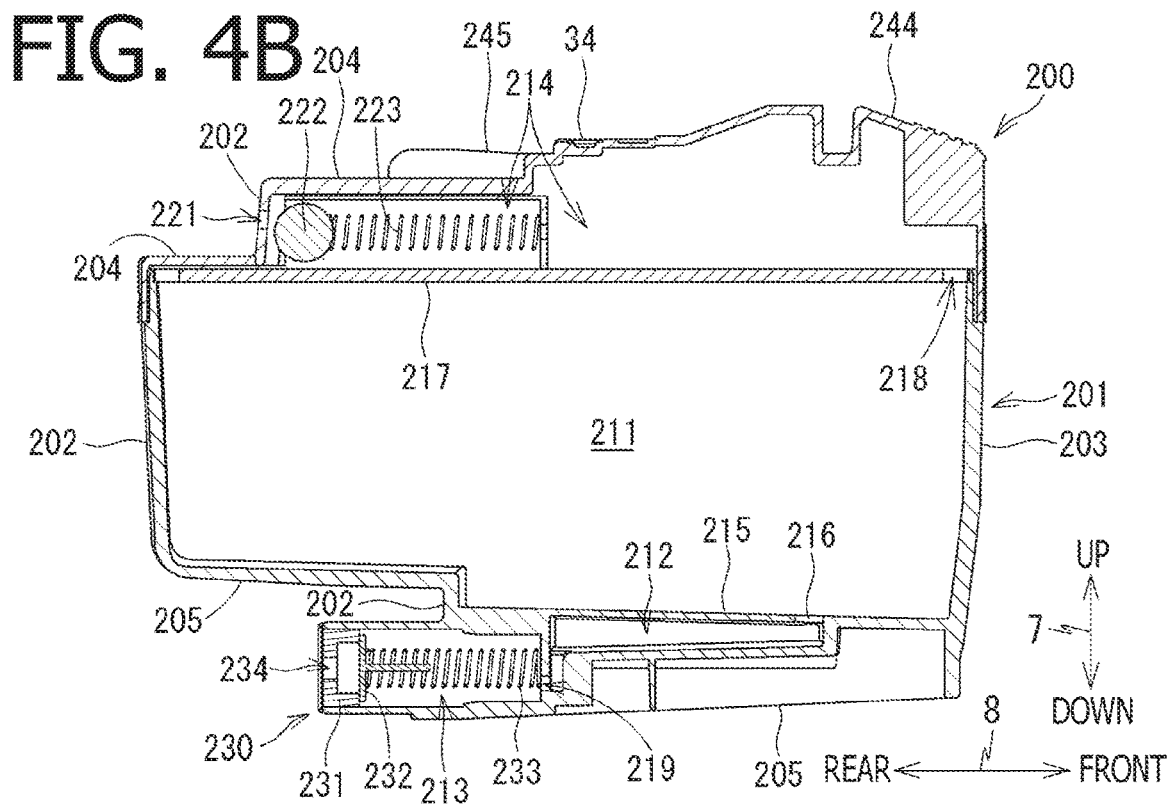

Inside each cartridge 200, as shown in FIG. 4B, formed are the liquid compartment 210, an ink valve compartment 213, and the air valve compartment 214. The liquid compartment 210 includes an upper liquid compartment 211 and a lower liquid compartment 212. The upper liquid compartment 211, the lower liquid compartment 212, and the air valve compartment 214 form the inner cavity in the body 201. Meanwhile, the ink valve compartment 213 forms an inner cavity in the supplier tube 230. The liquid compartment 210 may store the ink therein. The air valve compartment 214 connects the liquid compartment 210 to be in fluid communication with the atmosphere outside the cartridge 200.

The upper liquid compartment 211 and the lower liquid compartment 212 are separated from each other in the vertical direction 7 by a bulkhead 215 that divides the inner cavity in the body 201. Meanwhile, the upper liquid compartment 211 and the lower liquid compartment 212 are in fluid communication with each other through a through hole 216, which is formed through the bulkhead 215. The upper liquid compartment 211 and the air valve compartment 214 are separated from each other by a bulkhead 217 that divides the inner cavity in the body 201. Meanwhile, the upper liquid compartment 211 and the air valve compartment 214 are in fluid communication with each other through a through hole 218, which is formed through the bulkhead 217. The ink valve compartment 213 is in fluid communication with a lower end of the lower liquid compartment 212 through a through hole 219.

The air valve compartment 214 is continuous with the atmosphere outside the cartridge 200 through an air communication port 221, which is formed in the rear wall 202, at an upper position in the cartridge 200. Therefore, the air valve compartment 214 is in fluid communication with the liquid compartment 210, more specifically, to the upper liquid compartment 211, at one end, i.e., at the through hole 218, and with the atmosphere outside the cartridge 200 at the other end, i.e., at the air communication port 221. The air valve compartment 214 is in fluid communication with the atmosphere through the air communication port 221. Meanwhile, in the air valve compartment 214, arranged are a valve 222 and a coil spring 223. The valve 222 is movable in the air valve compartment 214 between a closed position and an open position along the front-rear direction 8. The valve 222 at the closed position closes the air communication port 221 and at the open position opens the air communication port 221. The coil spring 223 may urge the valve 222 in a direction to move from the open position toward the closed position, i.e., rearward, along the front-rear direction 8.

As the cartridge 200 moves to be attached to the attachment case 150, the rod 153 may enter the air valve compartment 214 through the air communication port 221. The rod 153 entering the air valve compartment 214 may move the valve 222 frontward from the closed position against the urging force of the coil spring 223 along the front-rear direction 8. When the valve 222 reaches the open position, the upper liquid compartment 11 becomes in fluid communication with the atmosphere. Meanwhile, the structure to open the air communication port 221 may not necessarily limited to those described above. For example, the rod 153 may push and tear a film that seals the air communication port 221 open.

The supplier tube 230 protrudes rearward along the front-rear direction 8 from the rear wall 202 at a lower position in the body 201. The supplier tube 230 is open rearward at a rear end thereof. In this regard, the ink valve compartment 213 connects the liquid compartment 210, which is continuous with the ink valve compartment 213 through the through hole 219, with the atmosphere outside the cartridge 200. Thus, the ink valve compartment 213 is in fluid communication with the liquid compartment 210, more specifically, to the lower liquid compartment 212, at one end, i.e., at the through hole 219, and to the atmosphere outside the cartridge 200 at the other end, i.e., at an ink supplier compartment 234, which will be described further below. In the ink valve compartment 213, arranged are a packing 231, a valve 232, and a coil spring 233.

At a center in the packing 231, formed through in the front-rear direction 8 is the ink supplier port 234. An inner diameter of the ink supplier port 234 is substantially smaller than an outer diameter of the needle 181. The valve 232 may move between the closed position and the open position along the front-rear direction 8. The valve 232 at the closed position contacts the packing 231 and closes the ink supplier port 234. The valve 232 at the open position is separated from the packing 231 and opens the ink supplier port 234. The coil spring 233 may urge the valve 232 in a direction to move from the open position toward the closed position, i.e., rearward, along the front-rear direction 8. The urging force of the coil spring 233 is greater than the urging force of the coil spring 186.

As the cartridge 200 moves to be attached to the attachment case 150, the supplier tube 230 may enter the guide 182, and the needle 181 may enter the ink valve compartment 213 through the ink supplier port 234. The needle 181 entering the ink valve compartment 213 may resiliently deform the packing 231 and liquid-tightly fit in an inner peripheral surface of the ink supplier port 234. As the cartridge 200 is pushed further in the attachment case 150, the needle 181 may move the valve 232 frontward against the urging force of the coil spring 233. Meanwhile, the valve 232 may move the valve 185 protruding through the opening 183 rearward against the urging force of the coil spring 186.

As the valve 185 moves rearward, the ink supplier port 234 and the opening 183 are connected, and the ink valve compartment 213 in the supplier tube 230 and the inner cavity in the needle 181 are connected with each other, as shown in FIG. 5.

Meanwhile, under the condition where the cartridge 200 is attached to the attachment case 150, as shown in FIG. 5, a part of the liquid compartment 210 and a part of the liquid compartment 171 overlap each other in a view along a horizontal direction. Moreover, a bottom of the liquid compartment 171 is located to be lower than a bottom of the liquid compartment 210. Therefore, the ink stored in the liquid compartment 210 may flow in the liquid compartment 171 in the tank 160 through the supplier tube 230 and the joint 180 that are connected with each other by an effect of a hydraulic difference.

On the upward surface of the upper wall 204, at a rearward position with respect to the protrusion 241, as shown in FIGS. 4A-4B, formed is a light-blocking rib 245. The light-blocking rib 245 protrudes upward from the upper face of the upper wall 204 and longitudinally extends in the front-rear direction 8. The light-blocking rib 245 is either made of a material or in a color that blocks the light emitted from the light emitter of the attachment sensor 32. The light-blocking rib 245 is, under the condition where the cartridge 200 is attached to the attachment case 150, located on a light path between the light emitter and the light receiver in the attachment sensor 32. Therefore, the attachment sensor 32 may output the lower-leveled signal to the controller 130 (see FIG. 6) in response to the condition where the cartridge 200 is attached to the attachment case 150. On the other hand, the attachment sensor 32 may output the higher-leveled signal to the controller 130 in response to a condition where the cartridge 200 is not attached to the attachment case 150. Thus, the controller 130 may detect the condition of the cartridge 200 being attached to the attachment case 150 based on the signal output from the attachment sensor 32.

As shown in FIGS. 4A-4B, on the upward surface of the upper wall 204, at a position between the light-blocking rib 245 and the protrusion 241 in the front-rear direction 8, arranged is an IC chip 34, on which the electrodes 248 are mounted. The IC chip 34 includes a memory device, which is not shown, and the electrodes 248 are electrically connected with the memory device. The electrodes 248 on an upper surface of the IC chip 34 are exposed so that the electrodes 248 may be conductive with the contact 152. In this regard, under the condition where the cartridge 200 is attached to the attachment case 150, the electrodes 248 are electrically conducted with the contact 152. The controller 130 may read and write information in the memory device in the IC chip 34 through the contact 152 and the electrodes 248.

The memory device in the IC chip 34 may contain type information, a serial number, and a cartridge remainder value concerning the cartridge 200. The type information may indicate whether the cartridge 200 is a small capacity cartridge or a large capacity cartridge and a color of the ink stored in the cartridge 200. The serial number is identifying information assigned to each cartridge 200. The cartridge remainder value indicates an amount of the ink stored in the cartridge 200. When the cartridge 200 is in an unused condition, the cartridge remainder value stored in the memory device is an initial remainder value indicating an initial ink remainder amount.

[Controller 130]

The printer includes the controller 130. The controller 130 includes, as shown in FIG. 6, a CPU 35, a memory 36, and a communication bus 39. The memory 36 includes a ROM 37, an EEPROM 61, and a RAM 62.

The ROM 37 may store programs including an operating system (OS) 37A and a controlling program 37B, by which the CPU 35 may control behaviors of the printer 10. In particular, the controlling program 37B may be run to conduct an image forming process and displaying process, which will be described further below. The OS 37A and the controlling program 37B are executed by the CPU 35 processing commands that are described in respective addresses. In the following paragraphs, actions that are caused by executing the commands from the OS 37A and the controlling program 37B may be expressed as actions taken by the controller 130. The controller 130 may include a hardware circuit with an IC designed to implement some or all of the actions to be caused by the OS 37A and the controlling program 37.

The EEPROM 61 may store information, such as device information concerning the printer 10. The device information may include information to identify the printer 10, such as, for example, a MAC address and a serial number of the printer 10. The EEPROM 61 may further store a first discharged amount value, a second discharged amount value, an initial cartridge remainder value, an initial tank remainder value, an S_Empty flag, and a C_Empty flag, which will be described further below.

The communication bus 39 is connected with the heads 21, the attachment sensors 32, the liquid-level sensors 33, the contacts 152, the display 28, a motor which is not shown, and the communication interface 31, which will be described further below. The controller 130 may drive the motor through the communication bus 39 so that the feed roller 23, the conveyer roller 25, and the ejection roller 27 may rotate under the control of the controller 130. Moreover, the controller 130 may output driving signals to drivable elements in the heads 21 through the communication bus 39 so that the heads 21 may discharge the inks through the nozzles 29 under the control of the controller 130.

The controller 130 may detect an attachment condition of the cartridges 200 to the attachment case 150, i.e., whether the cartridges 20 are attached to the attachment case 150, through the attachment sensors 32. The controller 130 may further detect the level of the ink in the liquid compartment 171, i.e., whether the level of the ink is higher than or equal to or lower than the threshold position P, based on the signal output from the liquid-level sensor 33.

The controller 130 may read the cartridge remainder values from the memory devices in the IC chips 34 through the electrodes 248 on the cartridges 200 attached to the attachment case 150 and the contacts 152. Moreover, the controller 130 may update the cartridge remainder values in the memory devices in the IC chips 34 through the electrodes 248 on the cartridges 200 attached to the attachment case 150 and the contacts 152.

[Actions to be Conducted by the Controller 130 in the Printer 10]

Actions to be taken by the controller 130 in the printer 10 will be described with reference to the flowcharts shown in FIGS. 7-11. Processes described in the following paragraphs and illustrated in the flowcharts in FIGS. 7-11 may be implemented by the CPU 35 running the controlling program 35 stored in the ROM 37 or by a hardware circuit (not shown) mounted on the controller 130. An order to process the steps in the flowcharts may not necessarily be fixed to the flow described below but may be altered within a scope of the present invention as set forth in the appended claims.

[Image Forming Process]

The controller 130 activates an image forming process as shown in FIG. 7 in response to input of a print command in the printer 10. The print command by the user may be received through, for example, but not necessarily limited to, the operation panel 22 or the display 28. For another example, the print command may be received from an external communication device through the communication interface 31. The print command includes image data for an image to be printed. The image data may be stored in the RAM 62 in the printer 10. In the following paragraphs, each of the cartridges 200 for magenta, cyan, yellow, and black inks and each of the four tanks 160 for magenta, cyan, yellow, and black inks may be collectively called as the cartridge 200 and the tank 160, respectively, in the singular form. In other words, each of the steps in the processes described below may be repeated for four times for the four colored inks although the steps in the processes may be described solely once.

In S11, the controller 130 determines whether the value in the S_Empty flag stored in the EEPROM 61 for the cartridge 200 indicates "on" or "off." The S_Empty flag contains either a value representing "on," which indicates the level of the liquid remaining in the tank 160 being lower than or equal to the upper end of the liquid outlet 174, or a value representing "off," which indicates the level of the liquid remaining in the tank 160 being higher than the upper end of the liquid outlet 174. In other words, the controller 130 writes the value for "on" in the S_Empty flag in the EEPROM 61 before the level of the ink remaining in the liquid compartment 171 in the tank 160 reaches the upper end of the liquid outlet 174. Until the value for "on" is written in the S_Empty flag in the EEPROM 61, the value indicating "off" is stored for the S_Empty flag in the EEPROM 61. It may be concerned that, when the level of the ink reaches the upper end of the liquid outlet 174, the air may be mixed in the ink and entrained to the nozzles in the head 21. The air in the nozzles may prevent the ink from flowing into the nozzles or being discharged correctly through the nozzles.

In this regard, the S_Empty flag may be utilized to prevent the air from entering the nozzles in the head 21. The controller 130 may write the value for "off" or "on" in the S_Empty flag in the EEPROM 61 in S14 or S65, which will be described further below, respectively. While the flowcharts omit detailed actions of the controller 130, the controller 130 may restrain the head 21 from discharging the ink through the nozzles in response to the value in the S_Empty flag in the EEPROM 61 indicating "on" and allow the head 21 to discharge the ink through the nozzles in response to the value in the S_Empty flag in the EEPROM 61 indicating "off."

If the controller 130 determines that the value in the S_Empty flags in the EEPROM 61 indicates "on" (S11: ON), in S12, the controller 130 determines whether the cartridge 200 having been attached to the attachment case 150 is exchanged with a new cartridge 200. In particular, the controller 130 may obtain the attachment signal for the cartridge 200 periodically. The controller 130 may determine whether the attachment signal for the cartridge 200 changes from a lower level (L) to a higher level (H) and thereafter from the higher level (H) to the lower level (L). In other words, the controller 130 monitors the changes in the attachment signals to determine whether the cartridge 200 with the lowered ink level has been exchanged with a new cartridge 200.

In S12, if the controller 130 determines that no new cartridge 200 has been attached to the attachment case 150 (S12: NO), the flow repeats S12 and obtains the attachment signal periodically. In S12, if the controller 130 determines that a new cartridge 200 is attached to the attachment case 150 (S12: YES), the flow proceeds to a first updating process in S13. Alternatively to the determination in S12, the controller 130 may conduct another process to determine the attachment of a new cartridges 200. For example, the controller 130 may read the IC chip 34 in the cartridge 200 to obtain a serial number of the cartridge 200 being attached to the attachment case 150 and determine whether the obtained serial number matches a previous serial number having been stored in the EEPROM 61. If the previous serial number stored in the EEPROM 61 does not match the serial number obtained from the memory device in the IC chip 34 in the cartridge 200 currently attached to the attachment case 150, the controller 130 may determine that the cartridge 200 has been exchanged with a new cartridge 200.

[First Updating Process]

Figure 8A:
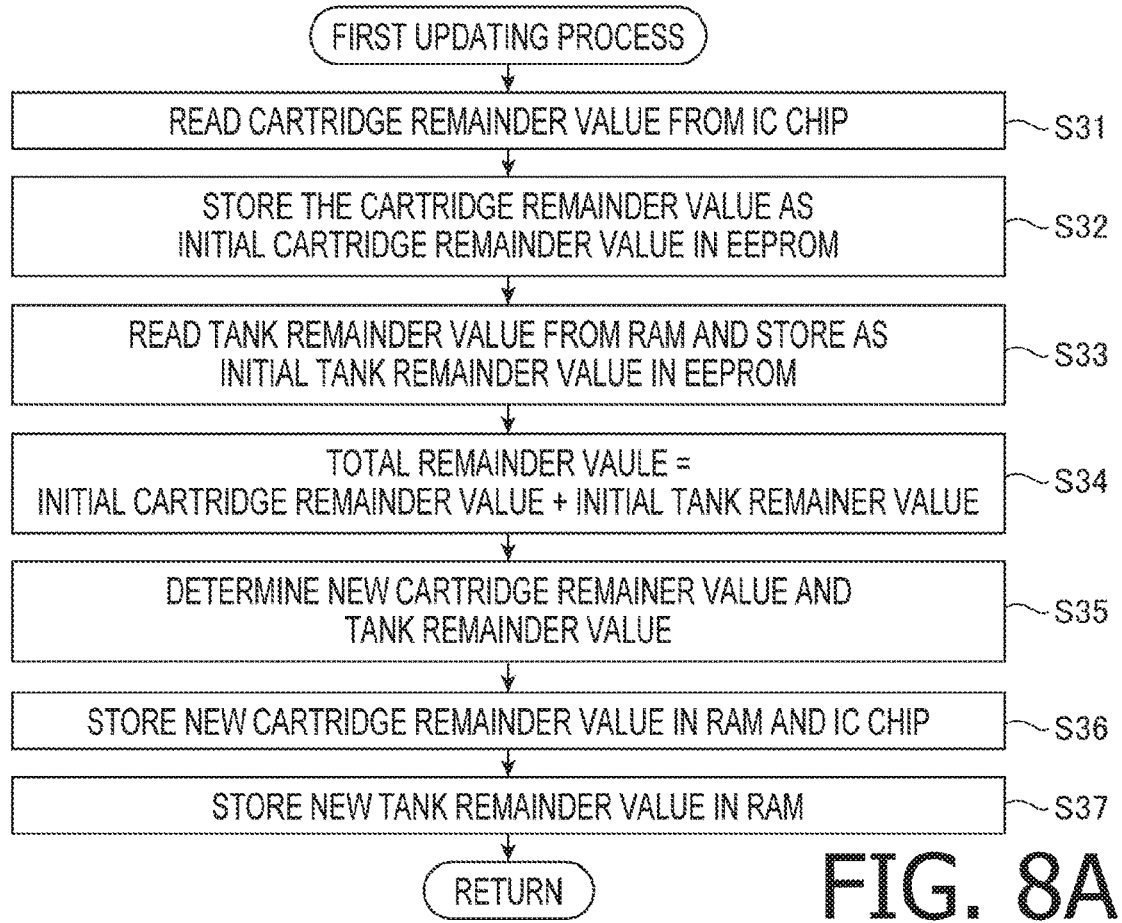

The first updating process shown in FIG. 8A may be conducted in order to update an initial cartridge remainder value and an initial tank remainder value, which are stored in the EEPROM 61, and a cartridge remainder value, which is stored in the IC chip 34 in the cartridge 200 currently attached to the attachment case 150.

In S31, the controller 130 reads the cartridge remainder value stored in the memory device in the IC chip 34 in the cartridge 200 attached to the attachment case 150 through the contacts 152. In S32, the controller 130 stores the cartridge remainder value read from the IC chip 34 in S31 in the EEPROM 61 as an initial cartridge remainder value.

In S33, the controller 130 reads the tank remainder value in the RAM 62. If the tank remainder value is not stored in the RAM 62 due to, for example, power outage in the past, the controller 130 may calculate the tank remainder value in a method similar to a fourth updating process (S21), which will be described further below, and store the calculated tank remainder value in the RAM 62. The tank remainder value stored in the RAM 62 should indicate a remainder amount of the ink in the liquid compartment 171 in the tank 160 immediately before the attachment of the new cartridge 200 to the attachment case 150. In other words, the tank remainder value indicates an amount of the ink remained in liquid compartment 171 in the tank 160 immediately before the previous cartridge 200 was detached from the attachment case 150. In S33, the controller 130 stores the tank remainder value read from the RAM 62 in the EEPROM 61 as an initial tank remainder value.

In S34, the controller 130 adds the initial cartridge remainder value to the initial tank remainder value to calculate a total remainder value, which indicates a total remainder amount of the ink remaining in the cartridge 200 and the tank 160. In S35, the controller 130 determines an updated cartridge remainder value and an updated tank remainder value based on the total remainder value calculated in S34 in consideration of the ink flow between the cartridge 200 and the tank 160 described in the following paragraphs.

When a new cartridge 200 is attached to the attachment case 150, a portion of the ink in the cartridge 200 may flow from the liquid compartment 210 into the liquid compartment 171 in the tank 160. In this regard, the level of the ink in the liquid compartment 210 in the cartridge 200 may be lowered, and the level of the ink in the liquid compartment 171 in the tank 160 may rise. The flow of the ink from the liquid compartment 210 in the cartridge 200 into the liquid compartment 171 in the tank 160 may stop when the hydraulic head of the ink in the liquid compartment 210 and the hydraulic head of the ink in the liquid compartment 171 are substantially equal. In this regard, the updated cartridge remainder value and the updated tank remainder value indicate an amount of the ink remaining in the liquid compartment 210 in the cartridge 200 and in the liquid compartment 171 in the tank 160, respectively, when there is no substantial difference between the hydraulic heads of the ink in the liquid compartment 210 and the liquid compartment 171.

The cartridge remainder value and the tank remainder value may be determined by, for example, calculation by the controller 130 through a function formula stored in the EEPROM 61 or the ROM 37 or based on a table prepared in the EEPROM 61 or the ROM 37. For example, the shapes of the liquid compartment 210 in the cartridge 200 and the liquid compartment 171 in the tank 160 are fixed and known to the manufacturer prior to shipping. Therefore, based on the shapes of the liquid compartment 210 and the liquid compartment 171, the cartridge remainder value and the tank remainder value are obvious to the manufacturer under the condition where there is no substantial difference between the hydraulic heads of the ink in the liquid compartment 210 and the liquid compartment 171. Therefore, formulas, by which the cartridge remainder value and the tank remainder value are calculated based on the total remainder value, or a table, in which the total remainder value is associated with the cartridge remainder value and the tank remainder value, may be prepared in advance and stored in the EEPROM 61 or the ROM 37 by the manufacturer. The controller 130 may determine the updated cartridge remainder value and the updated tank remainder value based on the formulas or the table.

In S36, the controller 130 stores the newly determined cartridge remainder value in the RAM 62. Further, the controller 130 stores the newly determined cartridge remainder value to update the cartridge remainder value in the memory device in the IC chip 34. Moreover, the controller 130 stores the newly determined tank remainder value in the RAM 62. The first updating process ends thereat. The flow returns to S13 in FIG. 7.

Following the first updating process in S13, in S14, the controller 130 stores the value for "off" in the S_Empty flag in the EEPROM 61 and stores the value for "off" in C_Empty flag in the EEPROM 61. Moreover, the controller 130 stores a value "0" (zero) as a first discharged amount value and a second discharged amount value in the EEPROM 61. The C_Empty flag, the first discharged amount value, and the second discharged amount value to be stored in the EEPROM 61 will be described further below. Following S14, the flow returns to S11.

In S11, the controller 130 determines the value in the S_Empty flag in the EEPROM 61 in the cartridge 200. If the controller 130 determines that the S_Empty flag indicates "off" (S11: OFF), in S15, the controller 130 obtains a liquid-level signals from the liquid-level sensor 33. In S16, the controller 130 prints an image on a sheet based on the image data stored in the RAM 62. As the image is printed on the sheet, the ink is discharged through the head 21, and discharging the ink may consume the ink; therefore, the level of the ink in the tank 160 may be lowered. In this regard, in S17, the controller 130 obtains the liquid-level signals after printing the image in S16 from the liquid-level sensor 33. In S18, the controller 130 determines the liquid level signal obtained in S15 and the liquid level signal obtained in S17. The liquid level signals may indicate a lower level (L) or a higher level (H).

In S18, if the controller 130 determines that the liquid-level signals stay unchanged at the lower level (L) (S18: L→L), the controller 130 conducts a second updating process in S19. The liquid level signal obtained in S15 indicating the lower level (L) may mean that the level of the ink remaining in the liquid compartment 171 in the tank 160 before printing the image (S16) is at a position higher than or equal to the threshold position P; and the liquid level signal obtained in S17 indicating the lower level (L) may mean that the level of the ink remaining in the liquid compartment 171 in the tank 160 after printing the image (S16) is at a position still higher than or equal to the threshold position P. In other words, after printing the image in S16, if the liquid level signal obtained in S17 indicates the lower level (L), the ink remains in the liquid compartment 210 in the cartridge 200.

[Second Updating Process]

Figure 8B:
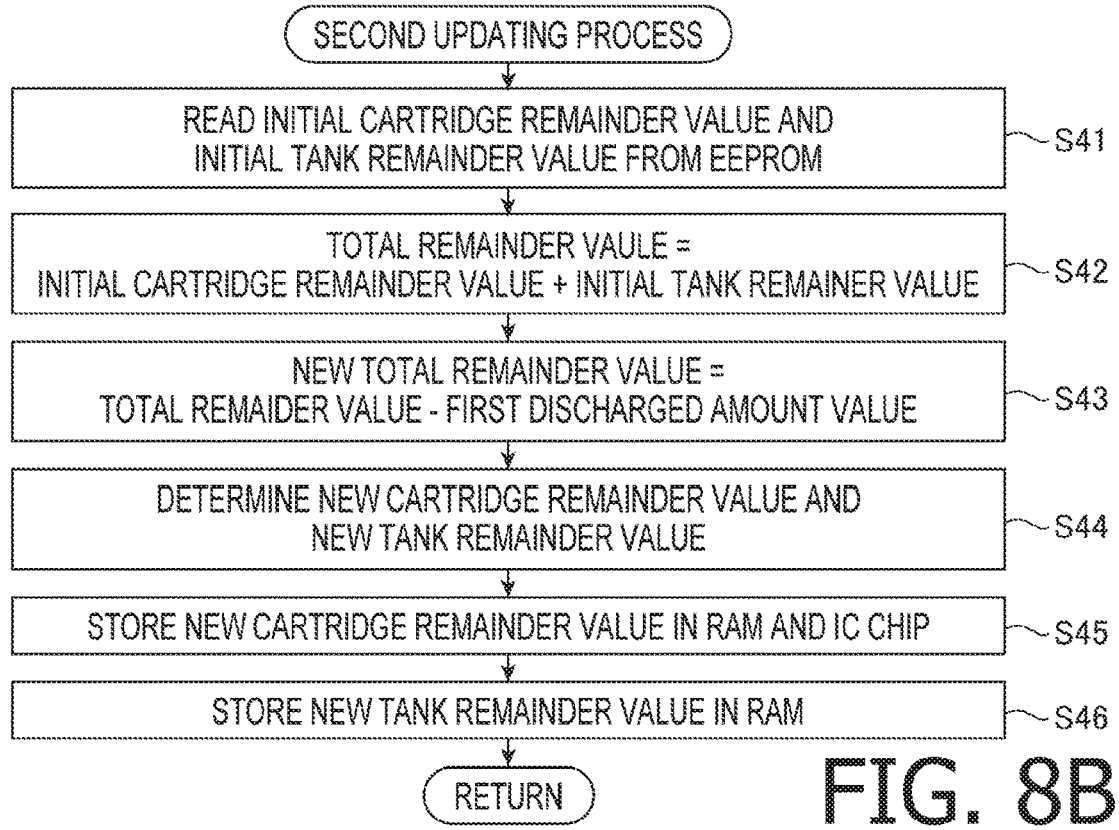

In the second updating process shown in FIG. 8B, the controller 130 may determine new values for the cartridge remainder value and the tank remainder value based on a first discharged amount value, which indicates an amount of the ink discharged in the image printing and maintenance in the past. The first discharged amount value for the ink may be obtained, for example, by multiplying an amount of the ink in a droplet dischargeable from the head 21 by a quantity of ink droplets having been discharged in the past. The controller 130 may count the first discharged amount value each time when the controller 130 commands the head 21 to discharge the ink. The counted first discharged amount values may be accumulated from the time of the attachment of the cartridges 200 up to the current moment. The accumulated first discharged amount values will be called as a first discharged amount value. In other words, the first discharged amount value is a sum of the amount of the ink discharged by the head 21 from the time of the attachment of the cartridges 200 up to the current moment. The first discharged amount value may be stored in the EEPROM 61.

In the second updating process, in S41, the controller 130 reads the initial cartridge remainder value and the initial tank remainder value stored in the EEPROM 61. In S42, the controller 130 adds the initial cartridge remainder value and the initial tank remainder value read in S41 to calculate a total remainder value and, in S43, subtracts the first discharged amount value from the total remainder value to calculate a latest total remainder value. In S44, the controller 130 determines new values for the cartridge remainder value and the tank remainder value based on the formulas or the table, in the same manner as S35-S36 in FIG. 8A.

In S45, the controller 130 stores the newly determined cartridge remainder value in the RAM 62 and in the memory device in the IC chip 34 to update the cartridge remainder value in the memory device. Moreover, in S46, the controller 130 stores the newly determined tank remainder value in the RAM 62. The second updating process ends thereat. The flow returns to S19 in FIG. 7.

Following the second updating process in S19, in S22, the controller 130 determines whether image data for a next image to be printed on a new sheet is stored in queue in the RAM 62. If the next image data is stored (S22: YES), the flow repeats S11 and the steps onward. If no next image data is stored (S22: NO), the image forming process ends thereat. The cartridge remainder value and the tank remainder value may not necessarily be determined in the method described above in the second updating process but may be determined in a different method.

In S11, if the controller 130 determines that the value in the S_Empty flag indicates "off" (S11: OFF), the controller 130 proceeds to S15, S16, S17, and S18. In S18, if the controller 130 determines that the liquid-level signals obtained in S15 and S17 indicate the lower level (L) and the higher level (H), respectively, (S18: L→H), the controller 130 conducts a third updating process in S20. The liquid level signal obtained in S15 indicating the lower level (L) may mean that the level of the ink remaining in the liquid compartment 171 in the tank 160 before printing the image (S16) is at a position higher than or equal to the threshold position P; and the liquid level signal obtained in S17 indicating the higher level (H) may mean that the level of the ink remaining in the liquid compartment 171 in the tank 160 after printing the image (S16) is at a position lower than the threshold position P. In this regard, after printing the image in S16, substantially no usable amount of ink remains in the liquid compartment 210 in the cartridge 200. In other words, the ink in the liquid compartment 210 in the cartridge 200 was exhausted through the image printing in S16.

[Third Updating Process]

Figure 8C:
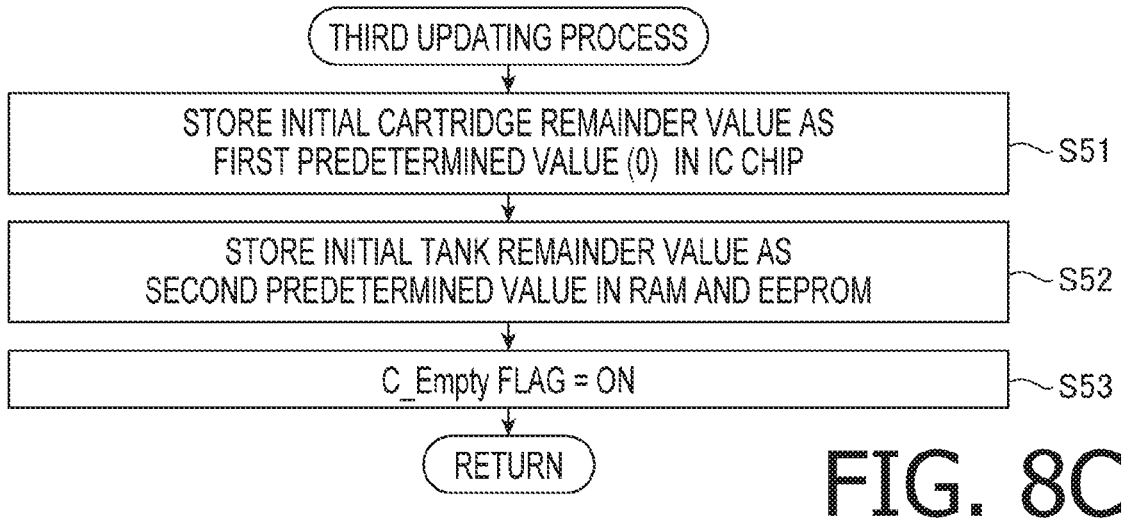

In the third updating process shown in FIG. 8C, the controller 130 may update the cartridge remainder value and the tank remainder value with a first predetermined value and a second predetermined value, respectively. That is, the first discharged amount value indicating the estimated amount of the ink having been discharged in the image printing or maintenance in the past may be different from an actual amount of the ink having been discharged. The third updating process may eliminate the differences contained in the first discharged amount value.

In S51, the controller 130 writes a first predetermined value over the initial cartridge remainder value having been stored in the memory device in the IC chip 34 to update the initial cartridge remainder value. The first predetermined value may be, for example, zero (0) and may be stored in the ROM 37. In S52, the controller 130 stores the initial tank remainder value as the second predetermined value in the EEPROM 61 and the RAM 62. The second predetermined value indicates an amount of the ink in the liquid compartment 171 in the tank 160 when the level of the ink in the liquid compartment 171 is at the threshold position P and may be prepared in advance in the ROM 37.

In S53, the controller 130 sets a value for "on" in the C_Empty flag in the EEPROM 61. The third updating process ends thereat.

Following the third updating process in S20, in S22, the controller 130 determines whether image data for a next image to be printed on a new sheet is stored in queue in the RAM 62. If the next image data is stored (S22: YES), the flow repeats S11 and the steps onward. If no next image data is stored (S22: NO), the image forming process ends thereat.

In S11, if the controller 130 determines that the value in the S_Empty flag indicates "off" (S11: OFF), the controller 130 proceeds to S16, S17, and S18. In S18, if the controller 130 determines that the liquid-level signals stay unchanged at the higher level (H) (S18: H→H), the controller 130 conducts a fourth updating process in S21. The liquid level signal obtained in S15 indicating the higher level (H) may mean that the level of the ink remaining in the liquid compartment 171 in the tank 160 before printing the image (S16) is at a position lower than the threshold position P; and the liquid level signal obtained in S17 indicating the higher level (H) may mean that the level of the ink remaining in the liquid compartment 171 in the tank 160 after printing the image (S16) is at a position lower than the threshold position P. In this regard, before and after printing the image in S16, substantially no usable amount of the ink remains in the liquid compartment 210 in the cartridge 200.

[Fourth Updating Process]

Figure 8D:
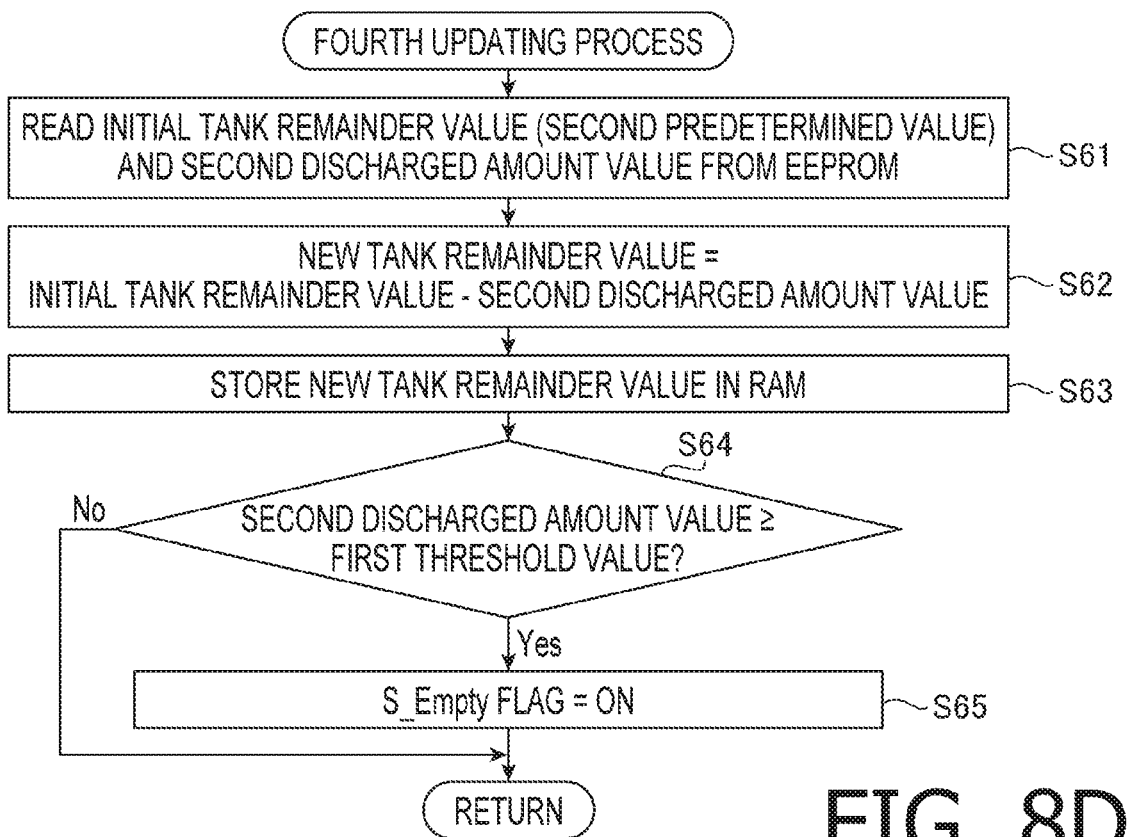

In the fourth updating process shown in FIG. 8D, the controller 130 calculates a value for the tank remainder value and determines whether printing an image should be continued or restricted. In particular, in S61, the controller 130 reads the initial tank remainder value, which is updated with the second predetermined value and stored in the EEPROM 61. In S62, the controller 130 subtracts a second discharged amount value from the initial tank remainder value to obtain an updated tank remainder value. The second discharged amount value may be obtained, in the similar manner to the first discharged amount value, by multiplying an amount of a droplet of the ink dischargeable from the head 21 by a quantity of ink droplets having been discharged within a certain period. The controller 130 may count the second discharged amount value each time when the controller 130 commands the head 21 to discharge the ink. The second discharged amount value indicates a sum of the amounts of the ink discharged by the head 21 from the time, when the signals from the liquid-level sensor 33 changed from the lower-level (L) to the higher level (H), up to the current moment. The second discharged amount value may be stored in the EEPROM 61.

In S63, the controller 130 writes the new value for the tank remainder value calculated in S62 in the RAM 62. In S64, the controller 130 determines whether the second discharged amount value has not yet reached a first threshold value, in other words, whether the second discharged amount value is smaller than the first threshold value, which may be prepared in advance in either the ROM 37 or the EEPROM 61. If the controller 130 determines that the second discharged amount value is smaller than the first threshold value (S64: YES), in other words, if the image is continuously printable, the fourth updating process ends thereat. On the other hand, if the controller 130 determines that the second discharged amount value reached the first threshold value, in other words, if the image may not be continuously printed (S64: NO), in S65, the controller 130 sets a value for "on" in the S_Empty flag on and ends the fourth updating process thereat. While the flowcharts omit detailed actions of the controller 130, the controller 130 may restrain the head 21 from discharging the ink through the nozzles, regardless of a purpose (e.g., for printing, maintenance, etc.), when the controller 130 determines that the value in the S_Empty flag in the EEPROM 61 indicates "on."

The first threshold value may be a value, which corresponds to a position substantially higher than the liquid outlet 174, for the surface of the ink in the liquid compartment 171 in the tank 160. In particular, the threshold position P technically designed to be detected by the liquid-level sensor 33 and the reference position P that may be actually detected by the liquid-level sensor 33 may differ depending on, for example, malfunction of the actuator 190. In this regard, the first threshold value is set to be a value, which corresponds to a position substantially higher than the liquid outlet 174, so that, when the second discharged amount value reaches the first threshold value, the surface of the liquid in the liquid compartment in the tank 160 may not fall into a range of the liquid outlet 174 even if a maximum amount of difference is caused between the technically designed threshold position P and the actually detectable threshold position P. Therefore, once the level of the ink in the liquid compartment 171 in the tank 160 is lowered to the position corresponding to the first threshold value, in order to avoid the air to be entrained in the ink and carried to the head 21, the controller 130 may restrict the ink from being discharged through the head 21.

Following the fourth updating process in S21, in S22, the controller 130 determines whether image data for a next image to be printed on a new sheet is stored in queue in the RAM 62. If the next image data is stored (S22: YES), the flow repeats S11 and the steps onward. If no next image data is stored (S22: NO), the image forming process ends thereat.

In the image forming process, as described above, the controller 130 may determine the cartridge remainder value and the tank remainder value based on the amount of the ink consumed each time when an image is printed on a sheet in S16. Meanwhile, the cartridge remainder value and the tank remainder value may not necessarily be updated on a sheet basis but may be updated on basis of a different unit, for example, each time a row of image is printed in a path on a sheet. Moreover, the second updating process, the third updating process, and the fourth updating process may be conducted not only when an image is printed but also when the inks are discharged from the heads 21 for, for example, maintenance or cleaning.

The controller 130 may utilize the cartridge remainder value, the tank remainder value, the S_Empty flag, and the C_Empty flag, which are updated in the first, second, third, or fourth updating process in S13, S19, S20, and S21, respectively, to display standby screens and ink remainder indication screens in the display 28 in a displaying process, which will be described below with reference to FIGS. 9-15.

[Displaying Process]

As shown in FIG. 9, in S71, the controller 130 determines whether each of the cartridges 200, which are the cartridge 200 for the magenta ink, the cartridge 200 for the cyan ink, the cartridge 200 for the yellow ink, and the cartridge 200 for the black ink, contains the ink. The controller 130 may determine whether the cartridges 200 contain the inks based on the values in the C_Empty flags. The controller 130 determines that the cartridges 200 all contain the inks if the values in the C_Empty flags all indicate "off" (S71: YES).

In S72, the controller 130 determines that the screen in the display 28 may not be displayed in a toggle-display mode, which will be described further below.

In S73, the controller 130 reads the cartridge remainder values for the four colors stored in the RAM 62. If the cartridge remainder values are not stored in the RAM 62 due to, for example, power outage in the past, the controller 130 may calculate the cartridge remainder values in the method described above in the first updating process.

In S74, the controller 130 utilizes the cartridge remainder values read in S73 to generate a standby screen and display the generated standby screen, as shown in FIG. 12A, in the display 28. The standby screen may contain a plurality of objects, including a plurality of function objects 100, each of which represents a function in the printer 10, and a first object 101, which represents cartridge remainder values indicating remainder amounts of the inks in the cartridges 200. In the following paragraphs, the standby screen as shown in FIG. 12A will be called as a first standby screen. It may be noted in the following paragraphs that the ordinal terms (e.g., first, second, . . . etc.) appended to the objects to be displayed in the screens on the display 28 may not necessarily be related to an order of significance or appearance of some objects over the other objects but should be considered merely as names of the objects.

The first object 101 includes bars having lengths that may indicate the cartridge reminder values. When, for example, the cartridge 200 is filled with the ink to a maximum amount, the bar in the first object 101 may be displayed to have a maximum length. As the ink in the cartridge 200 is consumed, the bar in the first object 101 may be displayed to be shorter, according to the amount of the ink remaining in the cartridge 200. When, for another example, the ink in the cartridge 200 is exhausted, the bar in the first object 101 may be displayed in a form of a blank frame. However, the form of the first object 101 to represent the remainder amounts of the inks in the cartridges 200 may not necessarily be limited to bars but may be in a different shape or may be replaced with signs or characters.

The first object 101 includes a first object 101M indicating a remainder amount of the magenta ink in the cartridge 200 for magenta, a first object 101C indicating a remainder amount of the cyan ink in the cartridge 200 for cyan, a first object 101Y indicating a remainder amount of the yellow ink in the cartridge 200 for yellow, and a first object 101Bk indicating a remainder amount of the black ink in the cartridge 200 for black.

The first object 101 may be displayed in a limited area in the standby screen. For example, the first object 101 may be displayed in a lower-rightward area in the standby screen.

As shown in FIG. 9, in S71, if the controller 130 determines at least one of the cartridges 200 exhausted the ink therein (S71: NO), in other words, if the controller 130 determines at least one of the values in the C_Empty flags indicates "on," the flow proceeds to S75. In S75, the controller 130 determines whether the tanks 160 all contain the inks. The controller 130 may determine whether the tanks 160 contain the inks based on the values in the S_Empty flags. In particular, the controller 130 may determine that the tanks 160 all contain the inks if the values in the S_Empty flags all indicate "off." In other words, the value in the S_Empty flag indicating "on" may mean that the surface of the ink in the tank 160 is lowered to the level, in which the air may be entrained in the ink and enter the tank 160.

In S75, if the controller 130 determines that at least one of the values in the S_Empty flags indicates "on" (S75: NO), in S76, the controller 130 determines that the screen in the display 28 may not be displayed in the toggle-display mode. In S77, the controller 130 reads the tank remainder values for the four colors stored in the RAM 62. If the tank remainder values are not stored in the RAM 62 due to, for example, power outage in the past, the controller 130 may calculate the tank remainder values in the method described earlier in the first updating process.

In S78, the controller 130 utilizes the tank remainder values read in S77 to generate a standby screen and display the generated standby screen, as shown in FIG. 12B. The standby screen shown in FIG. 12B is similar to the first standby screen as shown in FIG. 12A except that a second object 102 indicating the tank remainder values is displayed in place of the first object 101 indicating the cartridge remainder values. In the following paragraphs, the standby screen as shown in FIG. 12B will be called as a second standby screen.

The second object 102 includes bars having lengths that may indicate the tank remainder values. For example, a bar in the second object 102 may be displayed to have a maximum length until the ink in the cartridge 200 is exhausted and, thereafter, may be displayed to have a length according to the amount of the ink remaining in the tank 160. When, for another example, the level of ink in the tank 160 is lowered to the position where the air may be entrained in the ink, the bar in the second object 102 may be displayed in a form of a blank frame. However, the form of the second object 102 to represent the remainder amounts of the ink in the tanks 160 may not necessarily be limited to bars but may be in a different shape or may be replaced with signs or characters.

The second object 102 includes a second object 102M indicating a remainder amount of the magenta ink in the tank 160 for magenta, a second object 102C indicating a remainder amount of the cyan ink in the tank 160 for cyan, a second object 102Y indicating a remainder amount of the yellow ink in the tank 160 for yellow, and a second object 102Bk indicating a remainder amount of the black ink in the tank 160 for black.

The second standby screen may contain an eighth object 108, which may be displayed over the second object 102 when the level of the ink in the tank 160 is lowered to the position where the air may be entrained. For example, as shown in FIG. 12B, the eighth object 108, which is a cross-out mark (x), is displayed over the second object 102Y representing the remainder amount of the ink in the tank 160 for yellow. The eighth object 108 having the form of the cross-out mark (x) displayed over the second object 102Y may cause the user to recognize that the yellow ink in the tank 160 is exhausted so that the user may recognize that no further image printing may be continued.

In S75, as shown in FIG. 9, if the controller 130 determines that the tanks 160 all contain the inks, in other words, the values in the S_Empty flags all indicate "off" (S75: YES), in S79, the controller 79 determines that the screen in the display 28 should be displayed in the toggle-display mode. In other words, if the remainder amount of the ink in at least one of the cartridges 200 indicates the first predetermined value, which is, for example, zero (0), (see FIG. 8C) (S71: NO); and if the inks remain in all of the tanks 160 (S75: YES), the screen is displayed in the toggle-display mode.

In the present embodiment, a mode to display a standby screen shown in FIG. 13A and a standby screen shown in FIG. 13B alternately in the display 28 may be called as the toggle-display mode. In the following paragraphs, the standby screen as shown in FIG. 13A will be called as a third standby screen, and the standby screen as shown in FIG. 13B will be called as a fourth standby screen.

The third standby screen contains the first object 101, which indicates the cartridge remainder amounts. The fourth standby screen contains the second object 102, which indicates the tank remainder amounts. When, among the four cartridges containing the inks in magenta, cyan, yellow, and black, at least one of the cartridges 200 exhausts the ink, the first object 101 indicating the cartridge remainder values and the second object 102 indicating the tank remainder values are displayed alternately in the standby screen. The example in FIGS. 13A-13B shows that the yellow ink in the cartridge 200 for yellow is exhausted.

The third standby screen as shown in FIG. 13A contains a ninth object 109 displayed over the first object 101, which is a blank frame representing the cartridge 200 that exhausted the ink. In particular, the ninth object 109, which is an exclamation mark (!), is displayed over the first object 101Y representing the cartridge 200 for the yellow ink. The ninth object 109 having the form of the exclamation mark (!) displayed over the first object 101Y may cause the user to recognize that the yellow ink is exhausted in the cartridge 200 for yellow, i.e., empty.

Meanwhile, the fourth standby screen as shown in FIG. 13B contains a twelfth object 112 including text "SUB" displayed in an upper position with respect to the second object 102. The twelfth object 112 may cause the user to recognize that the second object 102 displayed in the display 28 represents not the cartridge remainder values but the tank remainder values.

In S80-S82, the controller 130 determines settings for the toggle-display mode. In particular, in S80, the controller 130 reads the cartridge remainder values and the tank remainder values for the inks in four colors in the RAM 62. If the cartridge remainder values and tank remainder values are not stored in the RAM 62 due to, for example, power outage in the past, the controller 130 may calculate the cartridge remainder values and tank remainder values in the method described earlier in the first updating process.

In S81, the controller 130 determines the lengths of the bars in the first object 101 and the second object 102 based on the cartridge remainder values and the tank remainder values read in S80. In S82, the controller 130 conducts a toggle interval determining process, in which a toggle interval is determined. The toggle interval is a length of time that may be determined by a time period for displaying the third standby screen and a time period for displaying the fourth standby screen. In the following paragraphs, described with reference to FIG. 11 will be a toggle interval determining process.

In S101, the controller 130 determines whether the tank remainder values read in S80 are all greater than or equal to a second threshold value, which is prepared in advance and stored in the EEPROM 61. The second threshold value may be, for example, 75% of an amount of the ink in the tank 160 when the surface of the ink is at the threshold position P.

In S101, if the controller 130 determines that the tank remainder values are all greater than or equal to the second threshold value (S101: YES), in S104, the controller 130 determines the toggle interval to be a first display interval. The first display interval may mean, that the third standby screen and the fourth standby screen are displayed alternately at a five (5) second interval. In particular, the third standby screen may be displayed for five seconds, thereafter, the fourth standby screen may be displayed for next five seconds; and the third standby screen and the fourth standby screen may be repeatedly displayed alternately at each five second. The length, e.g., 5 seconds, for displaying the third standby screen in the display 28 may be prepared and stored in advance in either the EEPROM 61 or the ROM 37.

Meanwhile, in S101, if the controller 130 determines that at least one of the tank remainder values is smaller than the second threshold value (S101: NO), in S102, the controller 130 determines whether the tank remainder values are all greater than or equal to a third threshold value. The third threshold value may be, for example, 50% of the amount of the ink in the tank 160 when the surface of the ink is at the threshold position P.

In S102, if the controller 130 determines that the tank remainder values are all greater than or equal to the third threshold value (S102: YES), in S105, the controller 130 determines the toggle interval to be a second display interval. The second display interval may mean, for example, that the third standby screen and the fourth standby screen are alternately displayed at four (4) seconds and five (5) seconds, respectively. In particular, the third standby screen may be displayed for four seconds, thereafter, the fourth standby screen may be displayed for next five seconds; and the third standby screen and the fourth standby screen may be repeatedly displayed alternately in a cycle of nine (9) seconds, i.e., at four and five seconds, respectively. The length, e.g., 4 seconds, for displaying the third standby screen in the display 28 may be prepared and stored in advance in either the EEPROM 61 or the ROM 37.

Meanwhile, in S102, if the controller 130 determines that at least one of the tank remainder values is smaller than the third threshold value (S102: NO), in S103, the controller 130 determines whether the tank remainder values are all greater than or equal to a fourth threshold value. The fourth threshold value may be, for example, 25% of the amount of the ink in the tank 160 when the surface of the ink is at the threshold position P.

In S103, if the controller 130 determines that the tank remainder values are all greater than or equal to the fourth threshold value (S103: YES), in S106, the controller 130 determines the toggle interval to be a third display interval. The third display interval may mean, for example, the third standby screen and the fourth standby screen are alternately displayed at three (3) seconds and five (5) seconds, respectively. In particular, the third standby screen may be displayed for three seconds, thereafter, the fourth standby screen may be displayed for next five seconds; and the third standby screen and the fourth standby screen may be repeatedly displayed alternately in a cycle of eight (8) seconds, i.e., at three and five seconds, respectively. The length, e.g., 3 seconds, for displaying the third standby screen in the display 28 may be prepared and stored in advance in either the EEPROM 61 or the ROM 37.

Meanwhile, in S103, if the controller 130 determines that at least one of the tank remainder values is smaller than the fourth threshold value (S103: NO), in S107, the controller 130 determines the toggle interval to be a fourth display interval. The fourth display interval may mean for example, the third standby screen and the fourth standby screen are alternately displayed at two (2) seconds and five (5) seconds, respectively. In particular, the third standby screen may be displayed for two seconds, thereafter, the fourth standby screen may be displayed for next five seconds; and the third standby screen and the fourth standby screen may be repeatedly displayed alternately in a cycle of seven (7) seconds at two and five seconds, respectively.

As described above, as the amounts of the inks remaining in the tanks 160 are reduced, the time period to display the third standby screen indicating the cartridge remainder amounts may be shortened. In this regard, the lower the tank remainder amounts are reduced to be, the more easily the user may recognize the tank remainder values.

Following one of S104, S105, S106, and S107, the controller 130 exits the toggle interval determining process and returns to the displaying process (see FIG. 9). Following the toggle interval determining process in S82, in S83, the controller 130 controls the display 28 to display the third standby screen and the fourth standby screen alternately at the display interval determined in the toggle interval determining process.

In S84, the controller 130 determines whether a fixed-display operation for displaying either the third standby screen or the fourth standby screen alone steadily is entered. The fixed-display operation may include, for example, touching the first object 101 in the third standby screen or the second object 102 in the fourth standby screen for a time period longer than or equal to a predetermined threshold length. For example, in response to a touch to the first object 101 lasting for a time period equal to the threshold length (e.g., 3 seconds) through the third standby screen, the controller 130 may determine that the fixed-display operation for displaying the third standby screen steadily is entered (S84: YES). For another example, in response to a touch on the second object 102 lasting for a time period equal to the threshold length (e.g., 3 seconds), the controller 130 may determine that the fixed-display operation for displaying the fourth standby screen steadily is entered (S84: YES).

While the user touches the first object 101 or the second object 102 through the display 28 with, for example, a finger, the finger may lower the visibility of the first object 101 or the second object 102 being touched by the user. In this regard, the controller 130 may control the display 28 to display the first object 101 or the second object 102 in a popup image (not shown) when the controller 130 determines that the first object 101 or the second object 102 is touched for a predetermined length (e.g., 1 second) of time or longer. In the popup image, for example, the first object 101 or the second object 102 may be enlarged and displayed in an area, e.g., at a center of the display 28, different from the original display area, e.g., the lower-rightward are in the display 28.

In S84, if the controller 130 determines that the fixed-display operation is entered (S84: YES), in S85, the controller 130 pins the third standby screen or the fourth standby screen to be displayed fixedly. In S86, the controller 130 determines whether a releasing operation is entered. The releasing operation may include touching the first object 101 or the second object 102 for a threshold length of time. For example, in response to a touch on the first object 101 or the second object 102 lasting for a time period equal to the threshold length (e.g., 3 seconds), the controller 130 may determine that the releasing operation is entered. In S86, if the controller 130 determines that the releasing operation is entered (S86: YES), in S87, the controller 130 releases the pinned display in either the third standby screen or the fourth standby screen. In particular, the controller 130 controls the display 28 to display the third standby screen including the first object 101 and the fourth standby screen including the second object 102 alternately at the interval determined in the toggle interval determining process in S82.

Thus, the controller 130 may control the display 28 to display the standby screen (see FIG. 12A) including the first object 101, which indicates the cartridge remainder amounts, when the cartridges 200 all contain the inks.

Meanwhile, when the ink in at least one of the tanks 160 is lowered to the level that may cause air entrainment, the controller 130 may control the display 28 to display the standby screen including the second object 102, which indicates the tank remainder amounts. Moreover, when the ink in at least one of the cartridges 200 is exhausted, but the tanks 160 all contain the inks that are substantial to continuously print an image, the first object 101 indicating the cartridge remainder amounts and the second object 102 indicating the tank remainder amounts are displayed alternately in the toggle-display mode in the display 28. In other words, when the cartridges 200 all contain the inks, the user may merely need to recognize the remainder amounts in the cartridges 200. Therefore, the first object 101 indicating the cartridge remainder amounts is displayed in the display 28 through the first standby screen. When at least one of the tanks 160 contains an insufficient amount of ink, on the other hand, the user may need to be notified of the color of the insufficient ink. Therefore, the second object 102 indicating the tank remainder amounts may be displayed through the second standby screen in the display 28. Meanwhile, when at least one of the cartridges 200 exhausted the ink, but the tanks 160 all contain the sufficient amount of inks to continue printing an image, the user may wish to know the cartridge remainder amounts and/or may wish to know the tank remainder amounts. Therefore, the first object 101 indicating the cartridge amounts and the second object 102 indicating the tank remainder amounts may be displayed through the third standby screen and the fourth standby screen in the toggle-display mode alternately in the display 28. Therefore, the user may recognize the remainder amounts of the inks efficiently.

Following one of S87, S74, and S78, or a negative determination in S84 (S84: NO) or in S86 (S86: NO) that no fixed-display operation or releasing operation is entered, in S91 (see FIG. 10), the controller 130 determines whether the first object 101 or the second object 102 including the bars that indicate the remainder amounts, in the standby screen shown in one of the standby screens shown in FIGS. 12A-12B and 13A-13B, is tapped by the user.

If the controller 130 determines that the first object 101 or the second object 102 including the bars is tapped by the user (S91: YES), in S92, the controller 130 determines whether the second object 102 in the second standby screen (see FIG. 12B) was tapped by the user.

In S92, if the controller 130 determines that the second object 102 in the second standby screen is tapped by the user (S92: YES), in S93, the controller 130 controls the display 28 to display a second cartridge exchanger screen as shown in FIG. 14B. The second cartridge exchanger screen includes a tenth object 110, a seventh object 107, and an eleventh object 111. The tenth object 110 may include an image of the cartridge 200 that exhausted the ink. The seventh object 107 may include a message such as "Please exchange the ink cartridge." The eleventh object 111 may include a character representing yellow, such as "Y." The second cartridge exchanger screen with the tenth object 110, seventh object 107, and the eleventh object 111 may therefore cause the user to recognize that the cartridge 200 for the yellow ink should be exchanged with another cartridge 200 containing the yellow ink. In other words, the second cartridge exchanger screen may advise the user to exchange the cartridge 200 for the yellow ink with a new cartridge 200.

In S92, on the other hand, if the controller 130 determines that the second object 102 in the second standby screen is not tapped by the user (S92: NO) in S94, the controller 130 determines whether the first object 101 in the first standby screen (see FIG. 12A) is tapped by the user.

In S94, if the controller 130 determines that the first object 101 in the first standby screen is tapped by the user (S94: YES), in S95, the controller 130 controls the display 28 to display an ink remainder indication screen as shown in FIG. 15A.

The ink remainder indication screen includes four (4) fourth objects 104, which indicate the cartridge remainder amounts for the four colored inks, and four (4) fifth objects 105, which indicate the tank remainder amounts for the four colored inks. The fourth objects 104 indicate the cartridge remainder amounts for the magenta, cyan, yellow, and black inks in the cartridges 200. The fifth objects 105 indicate the tank remainder amounts for the magenta, cyan, yellow, and black inks in the tanks 160. The fourth objects 104, similarly to the first object 101, each includes a bar having a length that may indicate the cartridge remainder amount in the cartridge 200. The fifth objects 105, similarly to the second object 102, each includes a bar having a length that may indicate the tank remainder amount in the tank 160. The fourth objects 104 are displayed to be larger than the first object 101, and the fifth objects 105 are displayed to be larger than the second object 102. In other words, the ink remainder indication screen may be a screen, in which the first object 101 and the second object 102 are enlarged, to be displayed at once in the display 28. The ink remainder indication screen may cause the user to recognize both the cartridge remainder amounts and the tank remainder amounts. In other words, the user may recognize the cartridge remainder amounts and the tank remainder amounts simultaneously through the ink remainder indication screen displayed in the display 28.

In S94, on the other hand, if the controller 130 determines that the first object 101 in the first standby screen was not tapped by the user (S94: NO), in S96, the controller 130 determines whether either the first object 101 in the third standby screen or the second object 102 in the fourth standby screen was tapped by the user.

If the controller 130 determines that the first object 101 in the third standby screen was tapped by the user (S96: THIRD STANDBY SCREEN), in S97, the controller 130 controls the display 28 to display a first cartridge exchanger screen as shown in FIG. 14A.

The first cartridge exchanger screen includes the tenth object 110 including an image of the cartridge 200 that exhausted the ink, a sixth object 106 including a text message such as "Ink cartridges may be exchanged," and the eleventh object 111 including a character representing yellow, such as "Y." The first cartridge exchanger screen may suggest that the cartridge 200 containing the yellow ink is exchangeable. In other words, the first cartridge exchanger screen may cause the user to recognize that the cartridge 200 for the yellow ink may be exchanged with another cartridge 200 containing the yellow ink. Thus, the first cartridge exchanger screen may suggest the user to exchange the cartridges 200 for the yellow ink.

In S96, on the other hand, if the controller 130 determines that the second object 102 in the fourth standby screen was tapped by the user (S96: FOURTH STANDBY SCREEN), in S95, the controller 130 controls the display 28 to display the ink remainder indication screen as shown in FIG. 15A.

As described above, the screen to be displayed in the display 28 may be determined among the first cartridge exchanger screen, the second cartridge exchanger screen, and the ink remainder indication screen depending on the user's operation to tap on either the first object 101 or the second object 102 through one of the first standby screen, the second standby screen, the third standby screen, and the fourth standby screen. Therefore, information concerning the remainder amounts of the inks may be efficiently informed to the user. For example, when the first object 101 is tapped by the user through the first standby screen, which may be displayed when the cartridges 200 all contain the inks, the ink remainder indication screen may be displayed in the display 28 so that the user may recognize the cartridge remainder amounts more specifically. For another example, when the second object 102 is tapped by the user through the second standby screen, which may be displayed when a remainder amount of the ink in at least one of the tanks 160 is insufficient to continue printing, the second cartridge exchanger screen may be displayed in the display 28 so that the user may recognize the cartridge 200 needs to be exchanged with a new cartridge 200. For another example, when the first object 101 is tapped by the user through the third standby screen, which may be displayed when at least one of the cartridges 200 exhausted the ink, the first cartridge exchanger screen may be displayed in the display 28 so that the user may be suggested that the cartridge 200 may be exchanged with a new cartridge 200. For another example, when the second object 102 is tapped by the user through the fourth standby screen, which may be displayed when the tanks 160 all contain sufficient amounts of inks to continue printing, the ink remainder indication screen may be displayed in the display 28 so that the user may recognize the tank remainder amounts more specifically.

In S98, as shown in FIG. 10, the controller 130 determines whether the first cartridge exchanger screen (S97), the second cartridge exchanger screen (S93), or the ink remainder indication (S95) should be closed. Specifically, the controller 130 determines whether a home button, which is not shown, was operated by the user, or a predetermined length of screen displayable period elapsed (i.e., timeout). The controller 130 may continue displaying the first cartridge exchanger screen, the second cartridge exchanger screen, or the ink remainder indication screen while the controller 130 determines that displaying the first cartridge exchanger screen, the second cartridge exchanger screen, or the ink remainder indication screen should not be closed (S98: NO). When the controller 130 determines that the first cartridge exchanger screen, the second cartridge exchanger screen, or the ink remainder indication screen should be closed (S98: YES), in S99, the controller 130 controls the display 28 to display the standby screen, and the displaying process ends thereat.

[Benefits]

According to the embodiment described above, when all of the cartridges 200 contain the respective inks, the first object 101 indicating the cartridge remainder amounts is displayed in the standby screen. Meanwhile, when at least one of the cartridges 200 exhausted the ink, and when all of the tanks 160 contain the inks that are sufficient to continue printing, the first object 101 indicating the cartridge remainder amounts and the second object 102 indicating the tank remainder amounts are displayed alternately in the toggle-display mode in the display 28. Therefore, the user may recognize the remainder amounts of the inks in the cartridges 200 and the remainder amounts of the inks in the tanks 160 efficiently.

According to the embodiment described above, the printer 10 may be a color printer, which may print a colored image in the four colored inks. Therefore, information concerning an ink remainder amount includes cartridge remainder amounts for the four colors and tank remainder amounts for the four colors. If the first object 101 indicating the cartridge remainder amounts for the four colors and the second object 102 indicating the tank remainder amounts for the four colors are displayed simultaneously in the standby screen, the standby screen may be unnecessarily informative or confusing, and the user may find difficulty in recognizing the information concerning the remainder amounts correctly. In this regard, in the present embodiment, when the cartridges 200 all contain the inks, the first object 101 indicating the cartridge remainder amounts is displayed in the standby screen. Meanwhile, when at least one of the cartridges 200 exhausted the ink, but when the tanks 160 all contain inks that are sufficient to continue printing, the first object 101 indicating the cartridge remainder amounts and the second object 102 indicating the tank remainder amounts may be displayed alternately in the toggle-display mode in the display 28. Therefore, while an amount of the information concerning the ink remainder amounts may be greater in a color printer compared to a monochrome printer, the user of the color printer may recognize the remainder amounts of the inks in the cartridges 200 and the remainder amounts of the inks in the tanks 160 efficiently.

According to the embodiment described above, as the tank remainder amount is lowered (e.g., 75%, 50%, 25%), the displayable period to display the third standby screen indicating the cartridge remainder amounts is shortened, i.e., the smaller the tank remainder amount is reduced to be, for the longer period of time the fourth standby screen indicating the tank remainder amounts is displayed. Therefore, as the tank remainder amount values are lowered, the user may recognize the tank remainder values more easily. In other words, the ink remainder amounts including the ink remainder amounts in the cartridges 200 and the ink remainder amounts in the tanks 160 may be informed to the user more efficiently.

According to the embodiment described above, while the third standby screen and the fourth standby screen may be displayed alternately in the toggle-display mode, the third standby screen or the fourth standby screen may be pinned to be displayed in the fixed-display mode. In other words, the cartridge remainder amounts or the tank remainder amounts may be steadily displayed depending on the user's preference. Therefore, the user may be provided with the information concerning the ink remainder amounts more preferably. Meanwhile, the fixed-display mode may be terminated so that the toggle-display mode may be resumed by the user's operation.

According to the embodiment described above, the screen to be displayed in the display 28 may be selected among the first cartridge exchanger screen, the second cartridge exchanger screen, and the ink remainder indication screen depending on the user's operation to tap on either the first object 101 or the second object 102 through one of the first standby screen, the second standby screen, the third standby screen, and the fourth standby screen. Therefore, information concerning the remainder amounts of the inks may be efficiently informed to the user.

According to the embodiment described above, when at least one of the tanks 160 contains an insufficient amount of ink to continue printing, the second standby screen (see FIG. 12B) including the second object 102 that indicates the tank remainder amounts may be displayed in the display 28. Therefore, information concerning the remainder amounts of the inks may be efficiently informed to the user.

According to the embodiment described above, when the second object 102 is tapped by the user through the second standby screen, the second cartridge exchanger screen indicating that the cartridge 200 needs to be exchanged with a new cartridge 200 may be displayed in the display 28. Therefore, information concerning the remainder amounts of the inks may be efficiently informed to the user.

Although an example of carrying out the invention has been described, those skilled in the art will appreciate that there are numerous variations and permutations of the image forming apparatus and the computer-readable storage medium that fall within the spirit and scope of the invention as set forth in the appended claims. In the following paragraphs, described will be modified examples of the embodiment.

First Modified Example

In the embodiment described above, the first standby screen or the second standby screen may be displayed in the fixed-display mode in response to the fixed-display operation, i.e., the user's touch on the first object 101 or the second object 102 for a time period longer than or equal to the threshold length through the third standby screen or the fourth standby screen, which are displayed alternately in the toggle-display mode. However, the fixed-display operation may not necessarily be limited to the touch on the first object 101 or the second object 102. For example, as shown in FIG. 15B, a third object 103, which may include an image of a pin, may be displayed in the third standby screen and the fourth standby screen. In response to the user's touch on the third object 103, in S84, the controller 130 may determine that the fixed-display operation is entered (S84: YES). If the controller 130 determines that the user tapped on the third object 103 while the third standby screen is displayed in the display 28, the controller 130 controls the display 28 to display the third standby screen fixedly in the fixed-display mode. Meanwhile, if the controller 130 determines that the user tapped on the third object 103 while the fourth standby screen is displayed in the display 28, the controller 130 controls the display 28 to display the fourth standby screen fixedly in the fixed-display mode.

In S86, if the controller 130 determines that the third object 103 was touched by the user while the third standby screen or the fourth standby screen is fixedly displayed (S86: YES), in S87, the controller 130 releases the third standby screen or the fourth standby screen from the fixed-display mode and display the third standby screen and the fourth standby screen in the toggle-display mode.

[Benefits by the First Modified Example]

According to the first modified example, the third object 103, through which the fixed-display operation and the releasing operation may be entered, may be displayed in the display 28. In this regard, the third object 103 may cause the user to recognize that one of the alternately displayed third standby screen and fourth standby screen may be pinned in the fixed-display mode. Moreover, the fixed-display operation and the releasing operation are as easy as tapping on the third object 103, which may be easier than tapping on the first object 101 or the second object 102 through the displayed third standby screen or the fourth standby screen. Therefore, the user may select the screen to be displayed in the display 28 more easily.

Second Modified Example

In the embodiment described earlier, not only the second object 102 (e.g., the second object 102Y alone), which indicates the tank remainder amount in the tank 160 corresponding to the cartridge 200 exhausting the ink, but all of the second objects 102M, 102C, 102Y, 102Bk, which indicate the tank remainder amounts in all of the tanks 160, are displayed. However, the second objects 102 to indicate the tank remainder amounts in the tanks 160 corresponding to the cartridges 200 that contain substantial remainder amounts of the inks (e.g., the second objects 102M, 102C, 102Bk) may not necessarily be displayed. In the second modified example, as shown in FIG. 16B, the fourth standby screen may display the second object 102 (e.g., the second object 102Y indicating the tank remainder amount of the yellow ink in the tank 160), which indicates the tank remainder amount in the tank 160 corresponding to the cartridge 200 exhausting the ink, may be displayed along with the first object 101 (e.g., the first objects 101M, 101C, 101Bk indicating the cartridge remainder amounts in the cartridges 200, which contains the substantial remainder amounts of inks). In other words, merely with regard to the cartridge 200 that exhausted the ink, the first object 101 and the second object 102 may be displayed alternately in the toggle-display mode in the fourth standby screen.

Meanwhile, the third standby screen to be displayed in the display 28 may be the same as the third standby screen in the embodiment described earlier. The fourth standby screen in the second modified example includes the second object 102Y, which indicates the tank remainder amount of the yellow ink in the tank 160 corresponding to the cartridge 200 that exhausted the ink, and the first objects 101M, 101C, 101Bk, which indicate the cartridge remainder amounts in the cartridges 200 containing the substantial remainder amounts of inks. Moreover, the fourth standby screen includes a thirteenth object 113, which may contain a letter "S," arranged on top of the second object 102. The thirteenth object 113 may inform the user that the second object 102Y being displayed indicates not the cartridge remainder value but the tank remainder value.

With regard to the other cartridges 200, which still contain the substantial remainder amounts of the inks therein, e.g., the cartridges 200 for the magenta, cyan, and black inks, the first objects 101, e.g., the first objects 101M, 101C, 101Bk, indicating the cartridge remainder values, are displayed in the third standby screen and the fourth standby screen. Meanwhile, with regard to the cartridge 200 that exhausted the ink, e.g., the cartridge 200 for the yellow ink, the first object 101 indicating the cartridge remainder amount and the second object 102 indicating the tank remainder amount are displayed alternately in the toggle-display mode. In the toggle-interval determining process (see FIG. 11) in the embodiment described earlier, the controller 130 determines whether the tank remainder amounts are all greater than or equal to the second threshold value in S101, greater than or equal to the third threshold value in S102, or greater than or equal to the fourth threshold value in S103. Meanwhile, in the second modified example, the controller 130 may determine whether the tank remainder amount in the tank 160 corresponding to the cartridge 200 that exhausted the ink is greater than or equal to the second threshold value, the third threshold value, or the fourth threshold value, in order to determine the display interval. The processes and the configuration in the printer 10 other than these steps in the toggle-interval determining process may be the same as those in the embodiment described earlier.

[Benefits by the Second Modified Example]

According to the second modified example of the embodiment, when one of the cartridges 200 exhausted the ink, the first object 101 and the second object 102 for the cartridge 200 that exhausted the ink alone may be displayed alternately in the toggle-displayed mode. Therefore, the user's attention may be focused on the cartridge 200 that exhausted the ink. Thus, the information concerning the ink remainder amounts may be recognized by the user more easily.

Third Modified Example

As shown in FIG. 6, the printer 10 may include the communication interface 31, which is connected with the communication bus 39. The controller 130 may transmit the cartridge remainder amounts and the tank remainder amounts to, for example, an external communication device through the communication interface 31. For example, the controller 130 may transmit the cartridge remainder amounts to the communication device through the communication interface 31 in a case where the first standby screen (see FIG. 12A) is being displayed in the display 28. The controller 130 may transmit the cartridge remainder amounts and the tank remainder amounts to the communication device through the communication interface 31 in a case where the third standby screen (see FIG. 12B) and the fourth standby screen (see FIG. 13B) are alternately being displayed in the display 28. In other words, the controller 130 may transmit the cartridge remainder values to the communication device through the communication interface 31 while the first object 101 indicating the cartridge remainder values in the first standby screen is being displayed in the display 28 or may transmit the cartridge remainder values and the tank remainder values to the communication device while the first object 101 and the second object 102 are being alternately displayed in the display 28.

The cartridge remainder values and the tank remainder values transmitted from the printer 10 through the communication interface 31 may be received by the communication device, which may be, for example, an information processing apparatus including a personal computer, a server, a tablet computer, and a mobile terminal, through a LAN or a USB cable connected with the communication interface 31. The information processing apparatus may have a status monitor installed therein and a display. The status monitor may control the display to display the cartridge remainder values and the tank remainder values received by the information processing apparatus. For example, the status monitor may control a display of the information processing apparatus to display the first object 101 indicating the cartridge remainder values in a case where the information processing apparatus received the cartridge remainder amounts or may display the first object indicating the cartridge remainder values and the second object indicating the tank remainder values alternately in a toggle-display mode.

[Benefits by the Third Modified Example]

According to the third modified example, in response to the first object 101 indicating the first remainder values being displayed in the display 28, the cartridge remainder values may be transmitted to the information processing apparatus; meanwhile, in response to the first object 101 and the second object 102 being displayed alternately in the display 28, the cartridge remainder values and the tank remainder values may be transmitted to the information processing apparatus. Therefore, the status monitor is not obliged to determine whether the first object 101 should be displayed or the first and second objects 101, 102 should be alternately displayed. Rather, the screens that are similar to those to be displayed in the display 28 of the printer 10 may be displayed in the display of the information processing apparatus. Therefore, without causing the status monitor to determine the object(s) to be displayed, the screen in the display 28 of the printer 10 and the screen in the display of the information processing apparatus may match automatically.

More Examples

In the embodiment described earlier, when the ink in at least one of the cartridges 200 is exhausted, the first object 101 indicating the cartridge remainder amounts and the second object 102 indicating the tank remainder amounts are displayed alternately in the toggle-display mode through the standby screen. Meanwhile, when the ink in at least one of the cartridges 200 is exhausted, the first object 101 and the second object 102 may not necessarily be displayed alternately in the toggle-display mode, but the second object 102 indicating the tank remainder amounts may be fixedly displayed in the standby screen. For another example, the second object 102 for the ink, which is exhausted in the cartridge 200, may be displayed fixedly in the standby screen while for the other inks, which still remain in the cartridges 200, the first object 101 may be displayed fixedly in the standby screen. For another example, when the ink in at least one of the cartridges 200 is exhausted while the other inks still remain in the cartridges 200, the second object 102 for the exhausted ink and the second object 102 for the remaining ink may together be displayed fixedly in the standby screen. In other words, when the ink in at least one of the cartridges 200 is exhausted, the second object 102 for all of the colors may be displayed fixedly in the standby screen.

For another example, the inks may not necessarily flow from the cartridges 200 to the tanks 160 due to the hydraulic differences but may be moved to flow from the cartridges 200 to the tanks 160 by, for example, the effect of gravity or by a force from pumps. In other words, the present disclosure may be applied to a printer, which may supply the inks from the cartridges 200 to the tanks by use of the gravity or a driving source.

For another example, the configuration of the liquid-level sensor 33 to detect the level of the liquid in the liquid compartment 171 of the tank 160 based on the signals output from the liquid-level sensor 33 may not necessarily be limited to the actuator 190 with the detectable part 194, which is movable between the first condition and the second condition, as long as the level of the ink in the liquid compartment 171 is detectable. For example, the liquid-level sensor 33 may detect the level of the ink in the liquid compartment 171 optically with use of a prism having different reflection rates depending on a condition of the rear wall 164 in the liquid compartment 171 contacting or not contacting the ink. For another example, the liquid-level sensor 33 may be an electrode rod arranged inside the liquid compartment 171.

For another example, the liquid to be contained in the cartridge 200 may not necessarily be limited to inks but, for example, the cartridge may contain a pre-processing liquid that may be discharged from the head 21 prior to printing an image. For another example, water to clean the head 21 may be contained in the cartridge.

For another example, the lengths of the displayable period to display the third standby screen and the fourth standby screen in the toggle-display mode may not necessarily be determined depending on the tank remainder values, but the third standby screen and the fourth standby screen may be displayed for lengths of displayable periods, which may be prepared in advance and stored in the EEPROM 61.

For another example, the printer 10 may not necessarily be limited to a color printer but may be a monochrome printer.

For another example, in order to determine whether the third standby screen and the fourth standby screen should be displayed alternately in the toggle-display mode, exhaust of the ink in the cartridge 200 may not necessarily be determined by the output from the liquid level sensor 33 but may be determined based on the cartridge remainder amounts or the tank remainder amounts updated in the second updating process.

What is claimed is:

1. A liquid consuming device, comprising:
   an attachment case, to which a cartridge comprising a first compartment to store a liquid is attachable;
   a first channel connectable with the first compartment in the cartridge attached to the attachment case;
   a tank comprising a second compartment connected with the first channel, the tank being configured to store the liquid supplied from the cartridge through the first channel, an amount of the liquid stored in the tank is lowered after an amount of the liquid stored in the cartridge attached to the attachment case is lowered to a first predetermined amount;
   a second channel connected with the second compartment in the tank;
   a head connected with the second channel;
   a display; and
   a controller configured to:
   in response to a first remainder amount being greater than or equal to the first predetermined amount, the first remainder amount being the amount of the liquid stored in the cartridge attached to the attachment case, control the display to display a first screen including a first object, the first object indicating the first remainder amount being the amount of the liquid stored in the cartridge; and
   in response to the first remainder amount being smaller than the first predetermined amount, control the display to display the first screen including a second object, the second object indicating a second remainder amount being the amount of the liquid stored in the tank and being displayed in place of the first object.

2. The liquid consuming device according to claim 1, wherein, in response to the first remainder amount being smaller than the first predetermined amount, the controller controls the display to display the first object and the second object alternately in the first screen.

3. The liquid consuming device according to claim 2, further comprising:
   a plurality of container sets, each of which includes the attachment case and the tank,
   wherein, in response to the first remainder amount of the liquid in the cartridge attached to the attachment case in one of the plurality of container sets being smaller than the first predetermined amount, the controller is configured to control the display to display the first object and the second object for the one of the container sets alternately in the first screen.

4. The liquid consuming device according to claim 3, wherein, in response to the first remainder amount of the liquid in the cartridge attached to the attachment case in another of the plurality of container sets being greater than or equal to the first predetermined amount, the controller is configured to control the display to display the first screen including the first object for the another of the container sets.

5. The liquid consuming device according to claim 3, wherein the controller is configured to control the display to display the first object and the second object alternately in the first screen for each of the plurality of container sets in the first screen.

6. The liquid consuming device according to claim 3, further comprising a memory,
   wherein the controller is configured to:
   obtain the second remainder amounts for all of the tanks in the plurality of container sets; and
   determine a first displayable period, in which the first object is displayed, and a second displayable period, in which the second object is displayed;
   wherein, in response to the second remainder amounts for all of the tanks in the plurality of container sets being greater than or equal to a threshold remainder amount stored in the first memory, the controller determines the first displayable period to be a first period stored in the memory and the second displayable period to be a second period stored in the memory; and
   wherein, in response to the second remainder amount for at least one of the tanks in the plurality of container sets being smaller than the threshold amount, the controller determines the first displayable period to be a third period stored in the memory and the second displayable period to be a fourth period stored in the memory.

7. The liquid consuming device according to claim 2, further comprising:
   a memory; and
   an input interface,
   wherein, based on a determination that input to the first object through the input interface lasted for a period longer than a threshold period stored in the memory, the controller is configured to control the display to display the first object fixedly in the first screen, and
   wherein, based on a determination that input to the second object through the input interface lasted for a period longer than the threshold period, the controller is configured to control the display to display the second object fixedly in the first screen.

8. The liquid consuming device according to claim 2, further comprising an input interface,
   wherein the controller is configured to:
   in response to the first remainder amount being smaller than the first predetermined amount, the controller is configured to control the display to display the first screen including a third object;
   accept input to the third object through the input interface;
   in response to a determination that an object having been displayed when the input to the third object was accepted is the first object, control the display to display the first object fixedly in the first screen; and
   in response to a determination that an object having been displayed when the input to the third object was accepted is the second object, control the display to display the second object fixedly in the first screen.

9. The liquid consuming device according to claim 2, further comprising an input interface,
   wherein the controller is configured to:
   accept input to one of the first object and the second object displayed in the first screen through the input interface, and
   wherein the controller is configured to:
   according to acceptance of the input to the first object in the first screen displayed in response to the first remainder amount being greater than or equal to the first predetermined amount, control the display to display a second screen, the second screen including a third object indicating the first remainder amount and a fourth object indicating the second remainder amount;

according to acceptance of the input to the first object in the first screen displayed in response to the first remainder amount being smaller than the first predetermined amount, control the display to display a third screen, the third screen including a fifth object indicating that the cartridge is exchangeable; and according to acceptance of the input to the second object in the first screen displayed in response to the first remainder amount being smaller than the first predetermined amount, control the display to display the second screen including the third object and the fourth object.

10. The liquid consuming device according to claim 2, wherein, in response to the first remainder amount being smaller than the first predetermined amount and in response to the second remainder amount being smaller than a second predetermined amount, the control is configured to control the display to display the first screen including the second object.

11. The liquid consuming device according to claim 10, further comprising an input interface, wherein the controller is configured to accept input to the second object displayed in the first screen through the input interface, and wherein, in response to the second remainder amount being smaller than the second predetermined amount and in response to acceptance of the input to the second object in the first screen, the controller controls the display to display a second screen, the second screen including a third object indicating that the cartridge needs to be exchanged.

12. The liquid consuming device according to claim 1, further comprising:

a sensor, the sensor being configured to output a first signal in response to a level of the liquid in the tank being at a position higher than or equal to a detector position and to output a second signal different from the first signal in response to the level of the liquid in the tank being at a position lower than the detector position, wherein the controller is configured to determine that the first remainder amount is smaller than the first predetermined amount in response to the sensor outputting the second signal.

13. The liquid consuming device according to claim 1, further comprising:

a first memory; and a connection interface, through which data stored in a second memory in the cartridge attached to the attachment case is obtainable, wherein the controller is configured to:

obtain the first remainder amount from the second memory;

count a value corresponding to an amount of the liquid consumed through the head since attachment of the cartridge to the attachment case and store the counted value in the first memory;

determine the first remainder amount after consuming the liquid through the head based on the first remainder amount obtained from the second memory and the counted value stored in the first memory.

14. The liquid consuming device according to claim 1, wherein the first compartment in the cartridge attached to the attachment case and the second compartment are in fluid communication with atmosphere, and wherein at least a part of the second compartment is located to be lower than the first compartment in the cartridge attached to the attachment case.

15. The liquid consuming device according to claim 1, further comprising a communication interface, wherein the controller is configured to:

transmit remainder information including information concerning the first remainder amount externally through the communication interface while the first screen including the first object is being displayed in response to the first remainder amount being greater than or equal to the first predetermined amount; and transmit remainder information including information concerning the first remainder amount and the second remainder amount externally through the communication interface while the first screen including the second object is being displayed in response to the first remainder amount being smaller than the first predetermined amount.

16. A non-transitory computer readable storage medium storing computer readable instructions that are executable by a computer in a liquid consuming device, the liquid consuming device comprising an attachment case, to which a cartridge comprising a first compartment to store a liquid is attachable, a first channel connectable with the first compartment in the cartridge attached to the attachment case, a tank comprising a second compartment connected with the first channel, a second channel connected with the second compartment in the tank, a head connected with the second channel, and a display, wherein the tank is configured to store the liquid supplied from the cartridge through the first channel, and an amount of the liquid stored in the tank is lowered after an amount of the liquid stored in the cartridge attached to the attachment case is lowered to a first predetermined amount, the computer readable instructions, when executed by the computer, causing the computer to:

in response to a first remainder amount being greater than or equal to the first predetermined amount, the first remainder amount being the amount of the liquid stored in the cartridge attached to the attachment case, control the display to display a first screen including a first object, the first object indicating the first remainder amount being the amount of the liquid stored in the cartridge; and in response to the first remainder amount being smaller than the first predetermined amount, control the display to display the first screen including a second object, the second object indicating a second remainder amount being the amount of the liquid stored in the tank and being displayed in place of the first object.

\* \* \* \* \*